(12) United States Patent
Simmons

(10) Patent No.: US 10,322,422 B2
(45) Date of Patent: Jun. 18, 2019

(54) DISENGAGING ARC ADJUSTING GEAR FOR AN IRRIGATION SPRINKLER WITH AN ADJUSTABLE REVERSING GEAR DRIVE

(71) Applicant: Hunter Industries, Inc., San Marcos, CA (US)

(72) Inventor: Zachary B. Simmons, Escondido, CA (US)

(73) Assignee: Hunter Industries, Inc., San Marcos, CA (US)

(*) Notice: Subject to any disclaimer, the term of this patent is extended or adjusted under 35 U.S.C. 154(b) by 161 days.

(21) Appl. No.: 15/639,561

(22) Filed: Jun. 30, 2017

(65) Prior Publication Data

US 2018/0029051 A1 Feb. 1, 2018

Related U.S. Application Data

(60) Provisional application No. 62/367,974, filed on Jul. 28, 2016.

(51) Int. Cl.
| | |
|---|---|
| *B05B 3/04* | (2006.01) |
| *B05B 15/74* | (2018.01) |
| *B05B 15/70* | (2018.01) |
| *F16H 3/60* | (2006.01) |
| *A01G 25/00* | (2006.01) |

(52) U.S. Cl.
CPC ............ *B05B 3/0431* (2013.01); *B05B 15/70* (2018.02); *F16H 3/60* (2013.01); *A01G 25/00* (2013.01); *B05B 15/74* (2018.02)

(58) Field of Classification Search
CPC ....... B05B 3/04; B05B 3/0409; B05B 3/0418; B05B 3/0422; B05B 3/0431; B05B 3/0436; B05B 15/70; B05B 15/72; B05B 15/74; F16H 3/60; A01G 25/00
USPC .... 239/201, 203–206, 237, 240, 242, 263.3, 239/DIG. 1

See application file for complete search history.

(56) References Cited

U.S. PATENT DOCUMENTS

| | | | | | |
|---|---|---|---|---|---|
| 3,785,565 | A | * | 1/1974 | Perry | B05B 3/0431 239/206 |
| 5,676,315 | A | * | 10/1997 | Han | B05B 3/0431 239/590 |
| 5,695,123 | A | * | 12/1997 | Van Le | B05B 3/0431 239/259 |
| 5,758,827 | A | * | 6/1998 | Van Le | B05B 3/0431 239/242 |
| 6,050,502 | A | * | 4/2000 | Clark | B05B 3/0431 239/237 |
| 6,802,458 | B2 | * | 10/2004 | Gregory | B05B 1/3026 239/205 |

(Continued)

*Primary Examiner* — Darren W Gorman
(74) *Attorney, Agent, or Firm* — Knobbe Martens Olson & Bear, LLP

(57) ABSTRACT

A sprinkler can include a turbine, a nozzle, a gear drive and a reversing mechanism. The gear drive and the reversing mechanism rotatably couple the turbine and the nozzle. The gear drive can shift a direction of rotation of an output stage that is coupled to the reversing mechanism. The sprinkler can include at least one arc adjusting gear that moves and arc adjusting tab to contact a shift arm to cause the shifting mechanism to change direction. The arc adjusting gear can engage with the arc tab for adjusting the arc setting and disengage from the arc tab for normal operation.

16 Claims, 19 Drawing Sheets

(56) References Cited

U.S. PATENT DOCUMENTS

| | | | | |
|---|---|---|---|---|
| 6,945,471 B2* | 9/2005 | McKenzie | ............ | B05B 3/0431 239/237 |
| 7,287,711 B2* | 10/2007 | Crooks | ................ | B05B 3/0431 239/240 |
| 7,644,870 B2* | 1/2010 | Alexander | .............. | B05B 15/70 239/1 |
| 8,469,288 B1* | 6/2013 | Clark | .................... | B05B 3/0431 239/242 |
| 8,628,027 B2* | 1/2014 | Kah, Jr. | ................ | B05B 1/262 239/206 |
| 8,777,124 B2* | 7/2014 | Clark | .................... | B05B 3/0431 239/11 |
| 8,857,742 B2* | 10/2014 | Onofrio | ................ | B05B 1/3013 239/580 |
| 8,939,384 B1* | 1/2015 | Anuskiewicz | ........ | B05B 3/0431 239/206 |
| 2015/0048174 A1* | 2/2015 | Onofrio | ................ | B05B 3/0454 239/1 |

* cited by examiner

Section A-A

Section B-B

Section B-B

Section B-B

Section B-B

Section B-B

Section B-B

Section B-B

Section B-B

Section 23-23

DISENGAGING ARC ADJUSTING GEAR FOR AN IRRIGATION SPRINKLER WITH AN ADJUSTABLE REVERSING GEAR DRIVE

CROSS-REFERENCE TO RELATED APPLICATION

This application claims benefit under 35 U.S.C. 119(e) to U.S. Provisional Patent Application No. 62/367,974, filed Jul. 28, 2016, the entire disclosure of which is hereby incorporated by reference herein in its entirety. Any and all priority claims identified in the Application Data Sheet, or any corrections thereto, are hereby incorporated by reference under 37 CFR 1.57.

This application is related to U.S. patent application Ser. No. 14/801,654, filed Jul. 16, 2015; to U.S. patent application Ser. No. 13/925,578, filed Jun. 24, 2013, now U.S. Pat. No. 8,955,768; to U.S. patent application Ser. No. 12/710,265, filed Feb. 22, 2010, now U.S. Pat. No. 8,469,288; and to U.S. patent application Ser. No. 11/761,911 filed Jun. 12, 2007, now U.S. Pat. No. 7,677,469. The entire contents of the above applications and patents are hereby incorporated by reference and made a part of this specification.

TECHNICAL FIELD

The present inventions relate to apparatus for irrigating turf and landscaping, and more particularly, to rotor-type sprinklers having a turbine that rotates a nozzle through a gear train reduction.

BACKGROUND

In many parts of the United States, rainfall is insufficient and/or too irregular to keep turf and landscaping green and therefore irrigation systems are installed. Such systems typically include a plurality of underground pipes connected to sprinklers and valves, the latter being controlled by an electronic irrigation controller. One of the most popular types of sprinklers is a pop-up rotor-type sprinkler. In this type of sprinkler a tubular riser is normally retracted into an outer cylindrical case by a coil spring. The case is buried in the ground and when pressurized water is fed to the sprinkler the riser extends. A turbine and a gear train reduction are mounted in the riser for rotating a nozzle turret at the top of the riser. The gear train reduction is often encased in its own housing and is often referred to as a gear box. A reversing mechanism is also normally mounted in the riser along with an arc adjustment mechanism.

The gear drive of a rotor-type sprinkler can include a series of staggered gears and shafts wherein a small gear on the top of the turbine shaft drives a large gear on the lower end of an adjacent second shaft. Another small gear on the top of the second shaft drives a large gear on the lower end of a third shaft, and so on. Alternately, the gear drive can comprise a planetary arrangement in which a central shaft carries a sun gear that simultaneously drives several planetary gears on rotating circular partitions or stages that transmit reduced speed rotary motion to a succession of similar rotating stages. It is common for the planetary gears of the stages to engage corresponding ring gears formed on the inner surface of the housing. See, for example, U.S. Pat. No. 5,662,545 granted to Zimmerman et al.

Two basic types of reversing mechanisms have been employed in commercial rotor-type sprinklers. In one design a reversing stator switches water jets that alternately drive the turbine from opposite sides to reverse the rotation of the turbine and the gear drive. See for example, U.S. Pat. No. 4,625,914 granted to Sexton et al. The reversing stator design typically employs a long metal shaft that can twist relative to components rigidly mounted on the shaft and undesirably change the reverse point. Stopping the rotation of the stator and changing direction of rotation via alternate water jets does not provide for good repeatable arc shift points. Users setting the arc of sprinklers that employ a reversing stator design do not get a tactile feel for a stop at the set reverse points.

Another design for the reversing mechanism of a rotor-type sprinkler includes four or six pinion gears meshed together and mounted between arc-shaped upper and lower frames that rock back and forth with the aid of Omega-shaped over-center springs. One of the inner pinion gears is driven by the gear drive and the pinion gears on opposite ends of the frames alternately engage a bull gear assembly. See for example, U.S. Pat. Nos. 3,107,056; 4,568,024; 4,624,412; 4,718,605; and 4,948,052, all granted to Edwin J. Hunter, the founder of Hunter Industries, Inc. The entire disclosures of said patents are hereby incorporated by reference.

Non-reversing, full circle rotation sprinklers such as golf rotors and stream sprinklers have been commercialized that have incorporated planetary gear boxes. Rotor-type sprinklers have also been commercialized that have combined planetary gear boxes and reversing mechanisms. More recently, adjustable arc part circle reversing sprinklers have been manufactured that have a reversing gear within the planetary gearbox where the reversing gear shifts from a first position that causes at least the output section of the planetary gear drive to rotate in a first direction or a second position that causes at least the output section of the planetary gear drive to rotate in a second direction.

SUMMARY

According some embodiments, a sprinkler can include a turbine, a nozzle, a gear drive and a reversing mechanism. The gear drive and reversing mechanism can rotatably couple the turbine and the nozzle. The gear drive and reversing mechanism can be coupled to shift a direction of rotation of an output stage of the gear drive. In some embodiments, the gear drive can include a control shaft that is axially movable to shift a direction of rotation of an output stage that is coupled to the reversing mechanism. The reversing mechanism can include a shift member secured to an upper end of the control shaft. The reversing mechanism can further include a mechanism to move the control shaft from a first position to a second position. In some embodiments, the control shaft may include a drive clutch. The gear drive may have two drive gears that alternately engage with the drive clutch. In some embodiments, the sprinkler may further include an adjustable shift tab to cause the reversing mechanism to shift from the first position to the second position and an arc adjusting gear shaft. In some embodiments the adjusting gear shaft may disengage from the adjustable shift tab when the sprinkler is in a normal operational mode and operatively coupled to the adjustable shift tab when a user is turning the arc adjusting gear shaft.

According to some embodiments, an irrigation sprinkler can include a turbine, a nozzle, a gear drive, and a reversing mechanism. The reversing mechanism can be operatively connected to the gear drive and rotatably coupling the turbine and the nozzle. The reversing mechanism can include a shift arm and a first adjustment gear having an axis of rotation. The irrigation sprinkler can include a first stop tab connected to the first adjustment gear. In some embodiments, the sprinkler includes a second adjustment gear configured to selectively mesh with and unmesh from the first adjustment gear. In some configurations, the irrigation sprinkler includes an adjustment shaft connected to the second adjustment gear, the adjustment shaft having a longitudinal axis and a user interface. In some embodiments, the adjustment shaft is configured to transition between a first position and a second position. In some embodiments, the longitudinal axis of the adjustment shaft is substantially parallel to the axis of rotation of the first adjustment gear in the first position. In some embodiments, the longitudinal axis of the adjustment shaft is not parallel to the axis of rotation of the first adjustment gear in the second position.

In some embodiments, the irrigation sprinkler includes a biasing member configured to bias the adjustment shaft to the second position.

In some embodiments, the biasing member is a spring.

In some embodiments, the second adjustment gear is unmeshed from the first adjustment gear when the adjustment shaft is in the second position.

In some embodiments, the second adjustment gear is meshed with the first adjustment gear when the adjustment shaft is in the first position.

In some embodiments, the irrigation sprinkler includes an adjustment clutch configured to engage with a portion of one or both of the adjustment shaft and the second adjustment gear.

In some embodiments, the adjustment shaft comprises an alignment surface and the adjustment clutch comprises an alignment surface. In some embodiments, interaction between the alignment surfaces of the adjustment shaft and adjustment clutch during rotation of the adjustment shaft transitions the adjustment shaft from the second position to the first position.

In some embodiments, the adjustment shaft comprises a plurality of adjustment surfaces. In some embodiments, the adjustment clutch comprises a plurality of walls. In some embodiments, a first of the plurality of adjustment surfaces is configured to slide along a first of the plurality of walls when the adjustment shaft is rotated in the second position. In some embodiments, said sliding brings a second of the plurality of adjustment surfaces into contact with a second of the plurality of walls. In some embodiments, the adjustment shaft is configured to transmit rotational force to the adjustment clutch via contact between the plurality of adjustment surface and the plurality of walls.

According to some variants, an irrigation sprinkler can include a turbine, a nozzle, a gear drive operatively connecting the turbine to the nozzle, and a reversing mechanism coupling an output stage of the gear drive to the nozzle, the reversing mechanism including a first adjustment gear. In some embodiments, the irrigation sprinkler includes an adjustment mechanism having a first end, a second end, and a longitudinal axis extending through the first and second ends. The adjustment mechanism can include an adjusting gear at the first end configured to selectively engage with the first adjustment gear and a user interface at the second end. In some embodiments, the adjustment mechanism is configured to transition between a first position and a second position wherein the longitudinal axis of the adjustment mechanism tilts as the adjustment mechanism transitions from the first to the second position.

In some embodiments, the adjusting gear of the adjustment mechanism is engaged with the first adjustment gear when the adjustment mechanism is in the first position and is disengaged from the first adjustment gear when the adjustment mechanism is in the second position.

In some embodiments, the irrigation sprinkler includes an adjustment clutch configured to tilt the adjustment mechanism when the adjustment mechanism is rotated by a user.

In some embodiments, the irrigation sprinkler includes an adjustment clutch configured to tilt the adjustment mechanism from the second position to the first position when the adjustment mechanism is rotated by a user. In some embodiments, the adjusting gear of the adjustment mechanism is engaged with the first adjustment gear when the adjustment mechanism is in the first position and is disengaged from the first adjustment gear when the adjustment mechanism is in the second position.

In some embodiments, the irrigation sprinkler includes a locking mechanism connected to the first adjustment gear and configured to inhibit rotation of the first adjustment gear when the adjustment mechanism is in the first position and to permit rotation of the first adjustment gear when the adjustment mechanism is in the second position in a second direction when a user rotates the adjustment mechanism.

In some embodiments, the irrigation sprinkler includes one or more teeth connected to the first adjustment gear and configured to engage with gear teeth of a ring gear, the ring gear fixed to a riser of the irrigation sprinkler. In some embodiments, the one or more teeth are configured to ratchet past teeth on the ring gear in a first direction or rotation of the first adjustment gear when a user rotates the adjustment mechanism.

According to some variants, an irrigation sprinkler includes a turbine, a nozzle, a gear drive, and a reversing mechanism. The reversing mechanism can be operatively connected to the gear drive and rotatably coupling the turbine and the nozzle, the reversing mechanism including a first adjustment gear having an axis of rotation. The irrigation sprinkler can include a second adjustment gear configured to selectively mesh with and unmesh from the first adjustment gear. The second adjustment gear can be configured to move away from the first adjustment gear in a direction perpendicular to the axis of rotation of the first adjustment gear when the second adjustment gear moves from being meshed with the first adjustment gear to being unmeshed from the first adjustment gear.

In some embodiments, the irrigation sprinkler includes an adjustment clutch configured to move the second adjustment gear toward the first adjustment gear when the second adjustment gear is rotated.

In some embodiments, the second adjustment gear is biased away from the first adjustment gear.

In some embodiments, the irrigation sprinkler includes an adjustment clutch configured to rotate with the second adjustment gear only after the second adjustment gear is rotated a predetermined amount greater than zero degrees.

In some embodiments, the adjustment clutch is fixed with respect to the first adjustment gear in a direction perpendicular to the axis of rotation of the first adjustment gear.

In some embodiments, the adjustment clutch is not in direct contact with the second adjustment gear.

According to some variants, an irrigation sprinkler includes a turbine, a nozzle, a gear drive, and a reversing mechanism. The reversing mechanism can be operatively connected to the gear drive and can rotatably couple the turbine and the nozzle. The reversing mechanism can include a shift arm and a first adjustment gear having an axis of rotation. The sprinkler can include a first stop tab connected to the first adjustment gear. In some embodiments, the sprinkler includes a second adjustment gear configured to selectively mesh with and unmesh from the first adjustment gear. The sprinkler can include a user interface cap configured to interface with a tool or with a hand of a user. In some embodiments, the user interface cap has a cam wall extending between a top cam wall end and a bottom cam wall end. The user interface cap can include a driving wall connected to the cam wall. In some embodiments, the sprinkler includes an adjustment shaft connected to the second adjustment gear and positioned at least partially within the user interface cap. The adjustment shaft can include a longitudinal axis and at least one protrusion extending from the adjustment shaft in a direction perpendicular to the longitudinal axis. In some embodiments, the cam wall is configured to drive the at least one protrusion in a direction parallel to the longitudinal axis of the adjustment shaft when the user interface cap is rotated. In some embodiments, the user interface cap is configured to transition the second adjustment gear between a meshed position and an unmeshed position with respect to the first adjustment gear without requiring application of force onto or movement of the user interface cap in a direction parallel to the longitudinal axis of the adjustment shaft.

In some embodiments, the sprinkler includes a biasing member configured to bias the adjustment shaft to the unmeshed position.

In some embodiments, the biasing member is a spring that surrounds at least a portion of the adjustment shaft.

In some embodiments, the user interface cap comprises two cam walls and two driving walls, each of the two driving walls connected to both of the two cam walls.

In some embodiments, the driving walls are configured to prevent rotation of the user interface cap with respect to the adjustment shaft upon contact between the at least one protrusion with the driving wall.

In some embodiments, the sprinkler includes an adjustment clutch configured to engage with a portion of one or both of the adjustment shaft and the second adjustment gear.

In some embodiments, the adjustment shaft comprises at least one external groove or rib. In some embodiments, the adjustment clutch includes at least one internal rib or groove. In some embodiments, the external groove or rib of the adjustment shaft is configured to mate with the internal rib or groove of the adjustment clutch In some embodiments, the adjustment clutch is rotationally locked with the adjustment shaft and the adjustment shaft is configured to move in a direction parallel to the longitudinal axis of the adjustment shaft with respect to the adjustment clutch.

In some embodiments, the adjustment clutch is configured to frictionally engage with an internal wall of the irrigation sprinkler with a first rotational coefficient of friction. In some embodiments, the user interface portion is configured to frictionally engage with the adjustment shaft with a second rotational coefficient of friction when the at least one protrusion of the adjustment shaft is not in contact with the drive wall. In some embodiments, the first coefficient of friction is greater than the second coefficient of friction.

According to some variants, an irrigation sprinkler includes a turbine, a nozzle, a gear drive, and a reversing mechanism. The reversing mechanism can be operatively connected to the gear drive and can be rotatably coupling the turbine and the nozzle. In some embodiments, the reversing mechanism includes a shift arm and a first adjustment gear having an axis of rotation. The sprinkler can include a first stop tab connected to the first adjustment gear. In some embodiments, the sprinkler includes a second adjustment gear configured to selectively mesh with and unmesh from the first adjustment gear. The sprinkler can include a user interface cap configured to interface with a tool or with a hand of a user. In some embodiments, the sprinkler includes an adjustment shaft connected to the second adjustment gear and positioned at least partially within the user interface cap. The adjustment shaft can have a longitudinal axis. In some embodiments, the user interface cap is configured to drive the adjustment shaft in a direction parallel to the longitudinal axis of the adjustment shaft between an unmeshed position and a meshed position with respect to the second adjustment gear. In some embodiments, the adjustment shaft is configured to move with respect to the user interface cap in a direction parallel to the longitudinal axis of the adjustment shaft as the adjustment shaft transitions between the meshed and unmeshed positions.

In some embodiments, the sprinkler includes a bearing configured to fix the user interface cap with respect to the nozzle in a direction parallel to the longitudinal axis of the adjustment shaft.

In some embodiments, the sprinkler includes a spring surrounding at least a portion of the adjustment shaft and configured to bias the adjustment shaft toward the user interface cap.

In some embodiments, the adjustment shaft is configured to remain in the unmeshed position in the absence of user or tool interaction with the user interface cap.

According to some variants, an irrigation sprinkler includes a turbine, a nozzle, a gear drive, and a reversing mechanism. The reversing mechanism can be operatively connected to the gear drive and can be rotatably coupling the turbine and the nozzle. The reversing mechanism can include a shift arm and a first adjustment gear having an axis of rotation. In some embodiments, the sprinkler includes a first stop tab connected to the first adjustment gear. The sprinkler can include a second adjustment gear configured to selectively mesh with and unmesh from the first adjustment gear. In some embodiments, the sprinkler includes a user interface cap configured to interface with a tool or with a hand of a user. The sprinkler can include an adjustment shaft connected to the second adjustment gear and positioned at least partially within the user interface cap. The adjustment shaft can have a longitudinal axis. In some embodiments, the user interface cap is fixed in position in a direction parallel to the longitudinal axis of the adjustment shaft. In some embodiments, the user interface cap is configured to move the adjustment shaft in a direction parallel to the longitudinal axis of the adjustment shaft in response to rotational force upon the user interface cap in a direction of rotation around the longitudinal axis of the adjustment shaft.

In some embodiments, the sprinkler includes a nozzle turret, wherein at least a portion of the user interface cap extends through a downstream end of the nozzle turret.

In some embodiments, the user interface cap includes a cam surface and the adjustment shaft includes a cam follower, wherein the cam surface is configured to drive the cam follower in a direction parallel to the longitudinal axis of the adjustment shaft in response to rotation of the user interface cap.

DETAILED DESCRIPTION

Irrigation sprinklers can be used to distribute water to turf and other landscaping. Types of irrigations sprinklers include pop-up, rotor-type, impact, spray and/or rotary-stream sprinklers. In some applications, such as that shown in FIG. 1, an irrigation system 2 can include multiple irrigation sprinklers 1 used to water a targeted area. One or more controllers (e.g., wireless and/or wired controllers) can be used to control the operation of multiple irrigation sprinklers. For example, one or more controllers can control when each of the sprinklers of the irrigation system transitions between an irrigating (e.g., ON) configuration and a non-irrigating (e.g., OFF) configuration. In some embodiments, the one or more controllers control the amount of water distributed by the sprinklers. The water source 9 for the irrigation system can be provided by a single water source, such as a well, a body of water, or water utility system. In some applications, multiple water sources are used.

Figure 1:
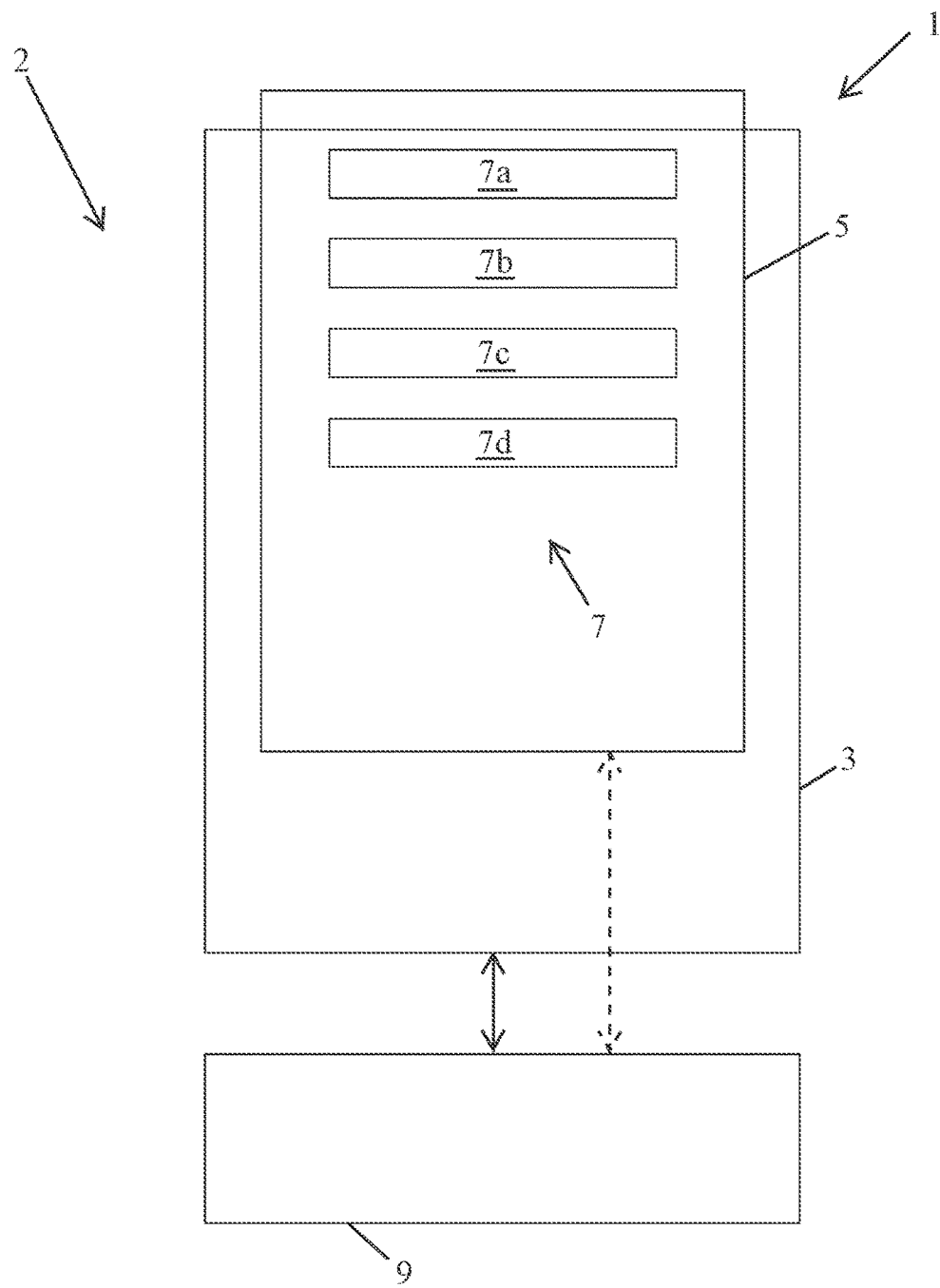
FIG. 1 is a schematic illustration of an irrigation sprinkler.

As schematically illustrated in FIG. 1, an irrigation sprinkler 1 can include an outer case 3. The outer case 3 can have a generally cylindrical shape or some other appropriate shape. A riser 5 can be positioned at least partially within the outer case 3. In some embodiments, such as pop-up sprinklers, the riser 5 is biased to a contracted or non-irrigating position within the outer case 3. The riser 5 may be biased to the contracted position by gravity and/or biasing structures such as springs. In some embodiments, the riser 5 transitions to an extended or irrigating position when pressure (e.g., water pressure) within the outer case 3 is high enough to overcome a biasing force on the riser 5. In some embodiments (e.g., non-pop-up sprinklers) the riser 5 is fixed in the extended position.

One or more mechanical components 7 can be positioned within the riser 5 and/or within the outer case 3. For example, the riser 5 can include an outlet 7a (e.g., a nozzle or outlet port). In some embodiments, the sprinkler 1 includes a plurality of outlets. The outlet 7a can direct water from the irrigation sprinkler 1 when the sprinkler 1 is ON. In some embodiments, the outlet 7a is connected to an outlet housing (e.g., a nozzle turret). The outlet housing and/or outlet 7a can be rotatable or otherwise moveable with respect to the riser 5 and/or outer case 3.

In some embodiments, the irrigation sprinkler 1 includes a turbine 7d. The turbine 7d can rotate in response to water entering an inlet end of the riser 5 and/or the outer case 3. The turbine 7d can be configured to rotate the outlet 7a. In some embodiments, a gear train reduction 7c is connected to the turbine 7d via an input shaft or otherwise. The gear train reduction 7c can transfer torque from the rotating turbine 7d to the outlet housing and/or outlet 7a via an output shaft, output clutch, or other output structure.

The sprinkler 1 can include a reversing mechanism 7b. The reversing mechanism 7b can be positioned within the riser 5 and/or within the outer case 3. In some embodiments, the reversing mechanism 7b is connected to the gear train reduction 7c and/or to the outlet 7a. The reversing mechanism 7b can be used to reverse the direction of rotation of the outlet 7a. In some embodiments, the reversing mechanism 7b reverses the direction of rotation of the outlet 7a without changing the direction of rotation of the turbine 7d. In some embodiments, the reversing mechanism 7b reverses the direction of rotation of the outlet 7a by reversing the direction of rotation of the turbine 7d.

In some embodiments, the reversing mechanism 7b reverses the direction of rotation of the outlet 7a via manual input. For example, a tool may be used to adjust the reversing mechanism 7b to reverse the direction of rotation of the outlet 7a. In some embodiments, the reversing mechanism 7b reverses the direction of rotation of the outlet 7a automatically via selected arc limiters. In some cases, at least one of the selected arc limiters can be adjusted to a desired position. In some cases, the user turns and adjusting gear shaft causing it to engage with the adjustable arc limiter and move the arc limiter to a desired position. In some cases the adjusting gear shaft automatically disengages from the arc limiter when it is not being adjusted Water may be provided to the sprinkler 1 via one or more water sources 9. The water source 9 may be fluidly connected to the outer case 3 and/or to the riser 5. In some embodiments, fluid communication between the water source 9 and the sprinkler 1 is controlled by one or more controllers, valves, or other apparatuses.

According to the present disclosure, a rotor-type sprinkler can include an outer case with a top portion and a bottom portion. A water inlet can be located in the bottom portion to permit ingress of water into the rotor-type sprinkler. The rotor-type sprinkler can include a turbine configured to rotate in response to the ingress of water. A nozzle of the rotor-type sprinkler can be configured to rotate in response to rotation of the turbine. A gear drive can be positioned within the outer case to provide gear reduction between the turbine and the nozzle. In some embodiments, the gear drive is a reversing gear drive configured to selectively reverse the rotation of the nozzle. The rotor-type sprinkler can also include a reversing mechanism configured to reverse the rotation of an output stage of the gear drive. The reversing mechanism can be located externally of the reversing gear drive.

In some embodiments, a reversing mechanism can be operatively connected to one or more gears in a reversing gear drive. The reversing mechanism can transition to engage the one or more gears between a plurality of operating positions/configurations to affect, for example, the rotational direction of the nozzle. The reversing gear drive can have any number of different configurations, a few examples of which are described below. For example, the reversing gear drive can be a reversing planetary gear drive 12 (FIG. 2A) or a reversing spur gear drive—(not illustrated). Other drive systems can also be used.

As illustrated and described below, the sprinkler 10 can include an adjustment gear to allow a user to set the rotational arc setting for the sprinkler 10.

Figure 2:
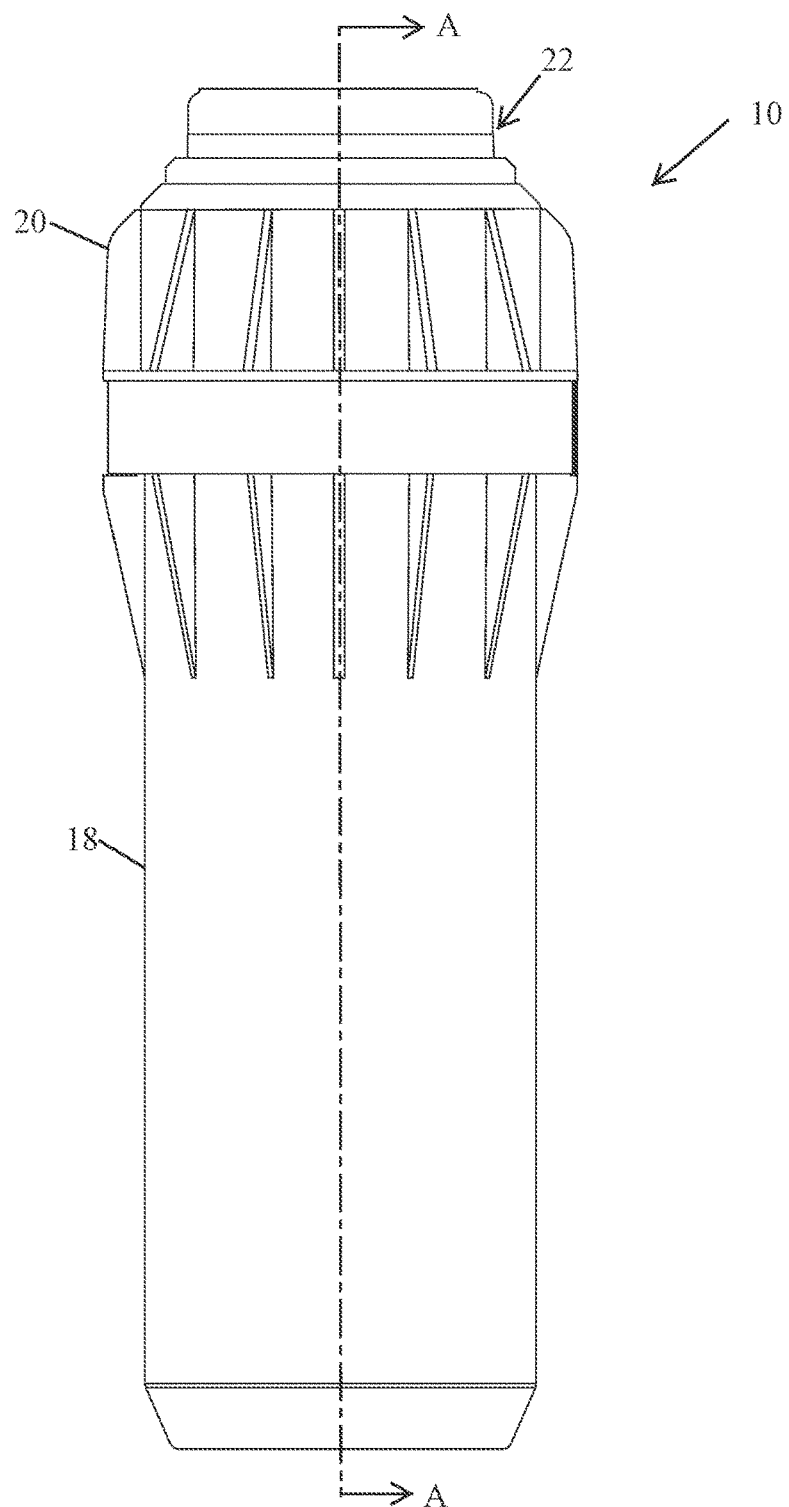
FIG. 2 is a vertical view of a rotor-type sprinkler incorporating an embodiment of the present inventions.
Figure 2A:
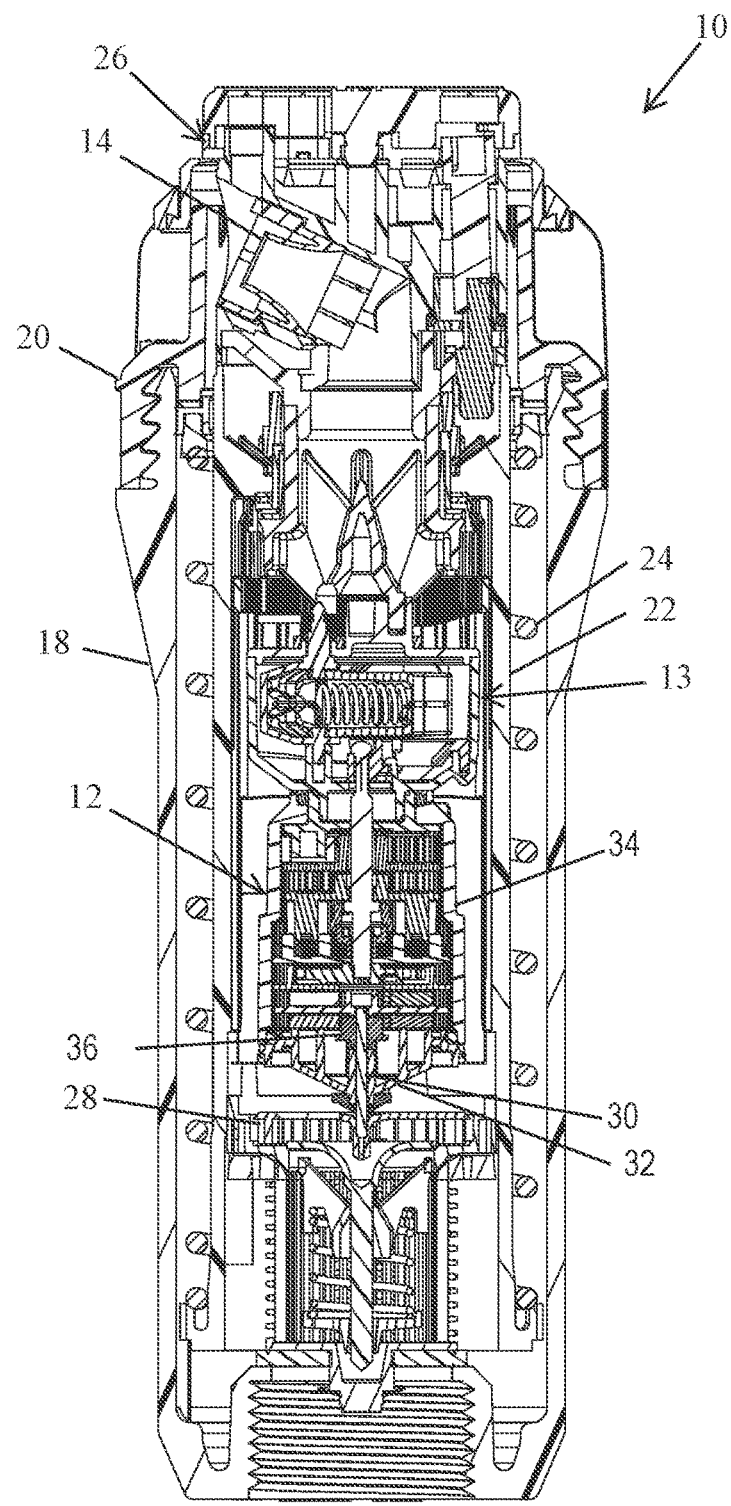
FIG. 2A is a vertical sectional view of the rotor-type sprinkler of FIG. 2 taken along the cut plane A-A.
Figure 2B:
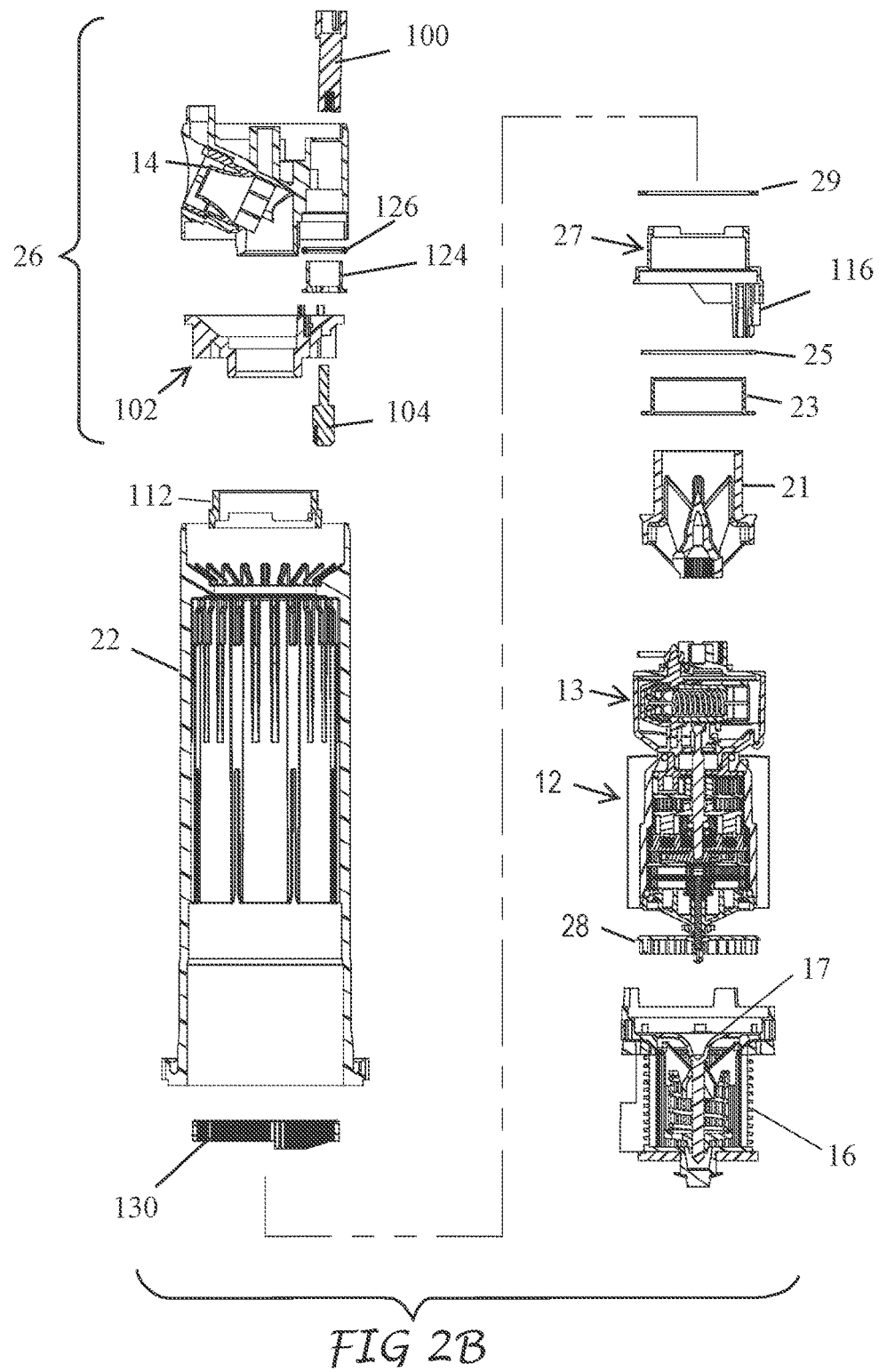
FIG. 2B is an exploded sectional view of the riser assembly of the sprinkler of FIG. 2.

Referring to FIG. 2A, in accordance with an embodiment of the present inventions a rotor-type sprinkler 10 incorporates a reversing planetary gear drive 12 (FIG. 2A) that rotates or oscillates a nozzle 14 between pre-set arc limits. Some or all of the components of the sprinkler 10 can be generally made of injection molded plastic. The sprinkler 10 includes an outer case 18 and a cap 20 that confines a generally tubular riser 22 (FIGS. 2, 2A and 2B). A coil spring 24 normally holds the riser 22 in a retracted position within the outer case 18. The nozzle 14 is carried inside a cylindrical nozzle turret 26 rotatably mounted to the upper end of the riser 22. The coil spring 24 is compressible to allow the riser 22 and nozzle turret 26 to telescope through the cap 20 from their retracted positions to their extended positions when pressurized water is introduced into the female threaded inlet at the lower end of the outer case 18.

Figure 3:
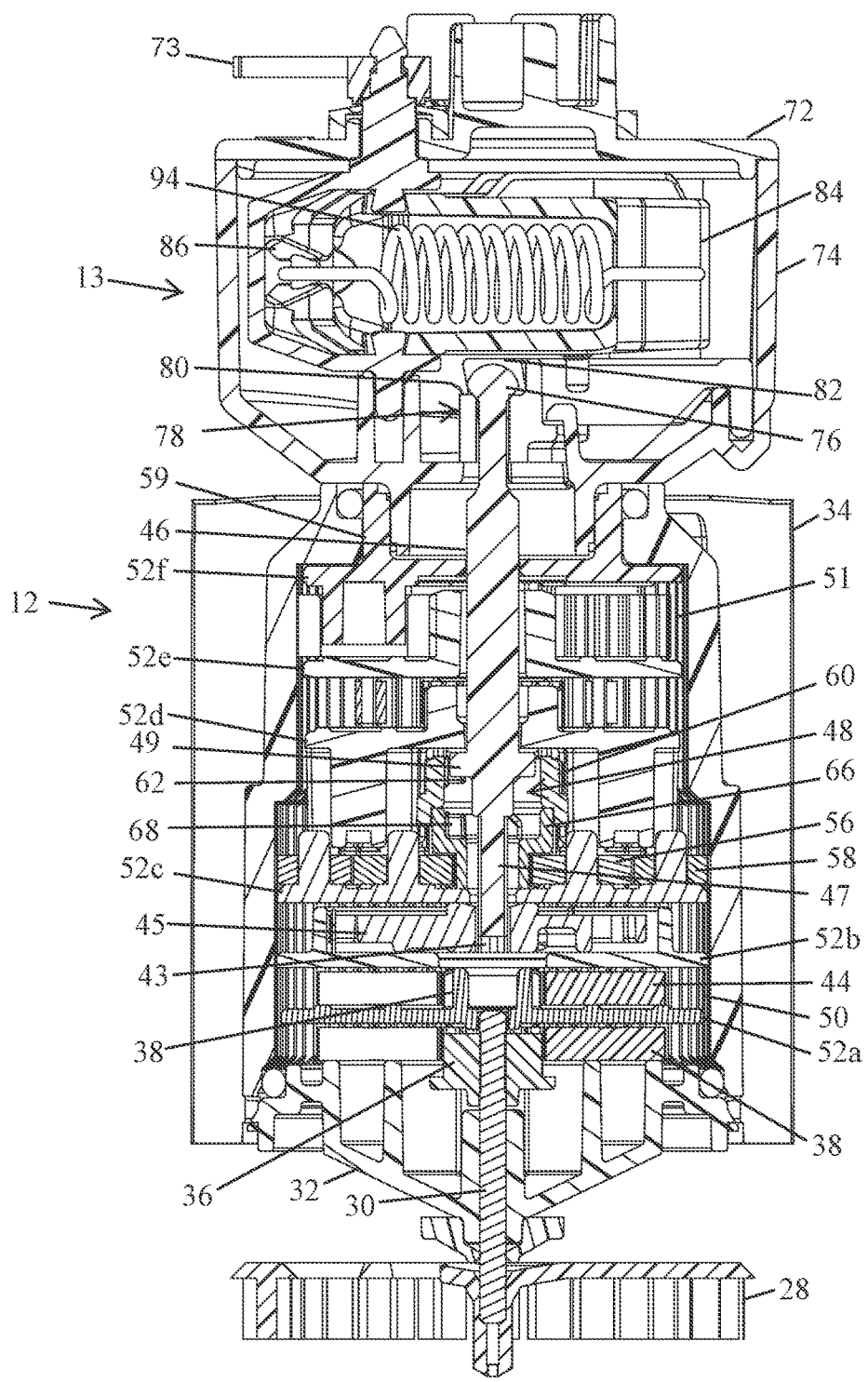
FIG. 3 is a sectioned view of the reversing planetary gear drive and reversing mechanism of the sprinkler of FIG. 2.

FIGS. 2A-3 illustrate further details of the riser 22, nozzle turret 26 and reversing planetary gear drive 12. A dirty water screen 16 is positioned near the bottom of the riser 22 to keep debris that may affect the operation of the sprinkler from entering the riser. A stator 17 directs water into and around a turbine 28. The turbine 28 is secured to the lower end of a vertically oriented drive input pinion shaft 30. The pinion shaft 30 extends through the lower cap 32 of a cylindrical gear box housing 34 of the reversing planetary gear drive 12. A turbine sun gear 36 can be secured to the upper end of the pinion shaft 30. The turbine sun gear 36 meshes with a first stage of planetary gears 38 that cause a first stage carrier 52A to rotate. Another sun gear 38 is formed on the upper side of the first stage carrier 52A and drives the second stage planetary gears 44 and the second stage carrier 52B of the reversing planetary gear drive 12. The stage carrier 52b functions as a drive housing of a one way drive coupling 45. Thus the turbine 28 is coupled to an input stage of the planetary gear drive 12.

Referring to FIG. 3, the reversing planetary gear drive 12 has a centrally located main control shaft 46. The lower end of the control shaft 46 is rigidly and co-axially coupled to a shifting drive clutch 48 which is vertically reciprocated by axial movement of the control shaft 46 between a raised state illustrated and a lowered state (not illustrated). The interior wall of the cylindrical gear box housing 34 is formed with two axially displaced ring gears 50 and 51. Each of the ring gears 50 and 51 comprises a plurality of circumferentially spaced, vertically extending, radially inwardly projecting teeth that are engaged by the various planet gears of the reversing planetary gear drive 12. The lower ring gear 50 has a larger diameter and more teeth than the upper ring gear 51. Together the ring gears 50 and 51 form a bi-level ring gear.

Referring still to FIG. 3 the reversing planetary gear drive 12 includes a third disc-shaped stage carrier 52c, a fourth disc-shaped stage carrier 52d, a fifth disc-shaped stage carrier 52e, and/or a sixth disc-shaped stage carrier 52f. The stage carrier 52F functions as an output stage of the planetary gear drive 12. The carriers 52a and 52b are positioned between the turbine 28 and the one way drive coupling 45. The carriers 52c, 52d, 52e and 52f rotate around the control shaft 46. A central spline opening 43 in the one way drive coupling 45 is drivingly coupled to a spline-shaped extension 47 of the shifting drive clutch 48 to allow for axial movement of the shifting drive clutch 48 relative to the upper gear 44. Thus the planetary gears 44 coupled to the second stage carrier 52b continuously rotates the drive coupling 45, shifting drive clutch 48 and the control shaft 46 during vertical axial reciprocating movement of the control shaft 46 and the shifting drive clutch 48.

Figure 4:
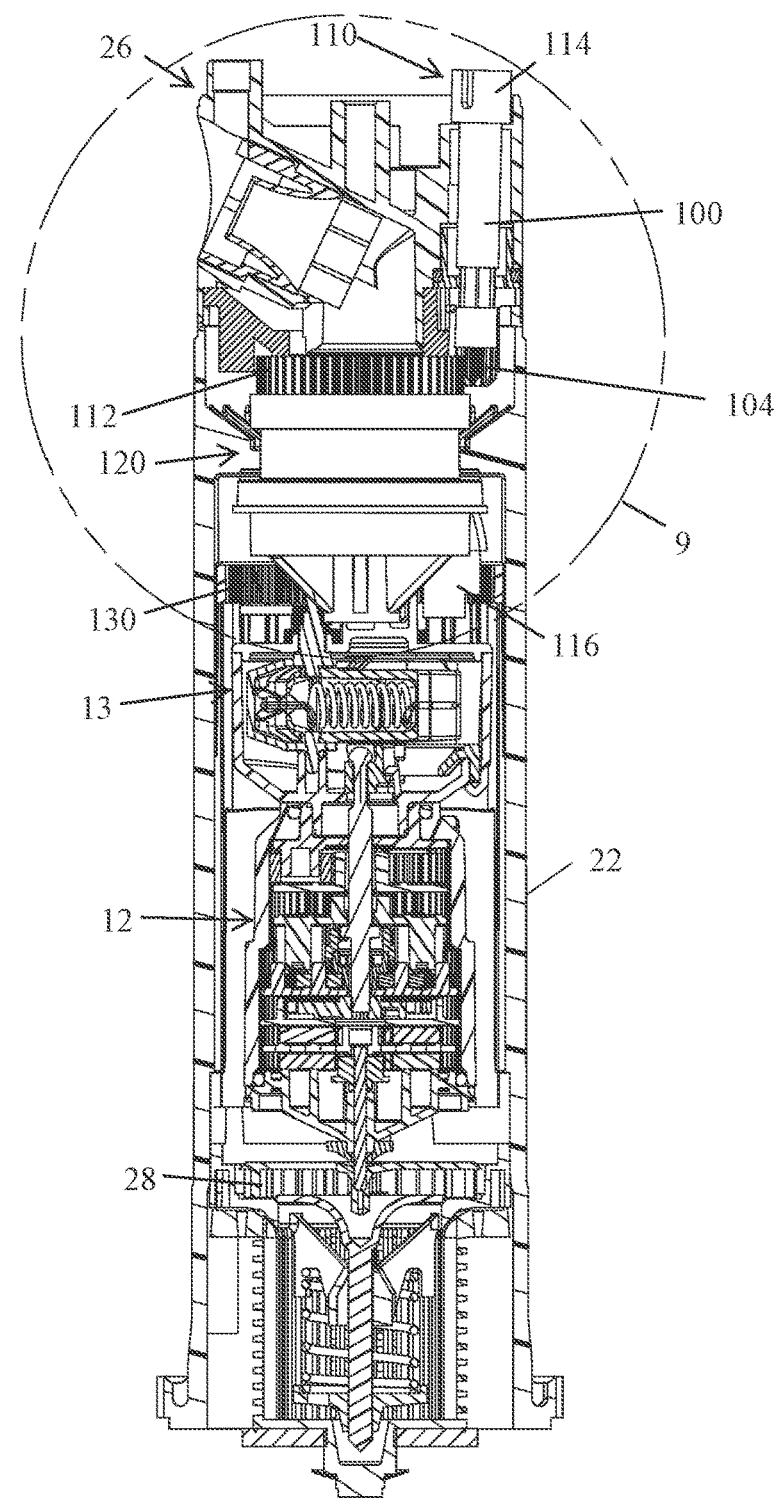
FIG. 4 is a sectioned view of the riser of the sprinkler of FIG. 2

When the shifting drive clutch 48 is in its raised state (FIGS. 3 and 4 the clutch dogs thereof engage and mesh with complementary internal clutch teeth 62 (FIG. 3) of the upper drive gear 60. When the shifting drive clutch 48 is in its lowered state (not illustrated), the clutch dogs thereof engage and mesh with internal clutch teeth 68 (FIG. 3) of the lower drive gear 66. The upper drive gear 60 meshes with the upper ring gear 51 formed on the interior wall of the gear box housing 34 thru the planet gear 54 (not illustrated). The lower drive gear 66 engages the transfer gear 56 which engages another planet gear 58, which in turn engages the lower ring gear 50. The direction of rotation of the disc shaped gear carrier 52*c* changes from a first direction when the shifting clutch 48 is engaged with the upper drive gear 60 to a second direction when the shifting clutch 48 is engaged with the lower drive gear 66. The disc shaped carrier 52*d* is directly coupled to the disc shaped carrier 52*c*. Thus the direction of rotation subsequently carried through the remaining stages of the reversing planetary gear drive 12 is reversed by up and down movement of the control shaft 46 and the shifting drive clutch 48.

The shifting drive clutch 48 can have a neutral position between engagement with the upper drive gear 60 and with the lower drive gear 66 in which it is not engaged with either of these two gears. This can reduce the likelihood that the shifting drive clutch 48 will strip either or both of the clutch teeth 62 and 68. The shifting drive clutch 48 is configured to rotate as a result of the upstream rotating gears that are driven by the turbine 28. If the clutch dogs of the shifting drive clutch 48 do not immediately engage with the gears 60 and 68 during shifting, the clutch teeth 49 are configured to align within one tooth of rotation. In some embodiments, the shifting drive clutch 48 is biased both upwardly and downwardly from this neutral position (e.g., by an over-center spring mechanism inside the reversing mechanism 13). This can ensure that the planetary gear drive 12 will be in one of two driving states, either rotating the nozzle 14 clockwise or counter-clockwise.

The level of rotational torque on the planet gears 54 and 58 can be fairly low. In some embodiments, the meshing of the shifting drive clutch 48 with the drive gear 60 and the lower drive gear 66 is very smooth. The smooth shifting transition can be influenced by the position of the shifting drive clutch 48 in the power transmission path of the planetary gear drive 12. The rotational speed of the turbine 28 is very high. If the shifting drive clutch 48 is placed too close to the turbine 28 in the power transmission path of the gear drive 12, the rotational speed of the shifting drive clutch 48 may be too fast, and shifting direction may be difficult as the clutch teeth 62 and 68 may tend to skip past the clutch dogs 49 instead of meshing smoothly. Likewise, the final output stage of the reversing planetary gear drive 12 generates substantial rotational torque. If the shifting drive clutch 48 is placed too close to the output stage (e.g., carrier 52*f*) in the power transmission path of the gear drive 12, the excessive torque may make it difficult for the clutch dogs 49 to slip axially across the faces of clutch teeth 62 and 68 and shifting may be difficult.

The reversing planetary gear drive 12 can include additional sun gears and planet gears which need not be described in detail as they will be readily understood by those skilled in the art of sprinkler design in view of FIGS. 2 and 3. The other planet gears also engage the ring gears 50 and 51 and rotate about corresponding fixed cylindrical posts that extend vertically from their associated disc-shaped carriers 52*a*, 52*b*, 52*c*, 52*d*, 52*e* and 52*f*. Each non-shifting sun gear can be secured to, and/or integrally formed with, one of the carriers 52*e* and 52*f*. The uppermost carrier 52*f* can have an upwardly projecting central section 59 (FIG. 3) that is coupled to the underside of the reversing mechanism 13 in order to rotate the same. The reversing mechanism 13 in turn supports and rotates a drive coupling 21. The drive coupling 21 is further supported by an outer bushing 23 which supports a lower thrust bearing 25, an adjustable shift tab carrier 27, and an upper thrust washer 29. The drive coupling 21 rotationally couples the reversing mechanism 13 to the nozzle turret 26. With this arrangement of gears the high RPM of the turbine 28 is successively reduced so that the final output RPM of the gear drive 12 is relatively low, and the output torque at the central section 59 of the uppermost carrier 52*f* is relatively high. For example, the turbine 28 may rotate at eight hundred RPM and the central section 59 of the uppermost carrier 52*f* may rotate at an RPM of less than twenty.

In some embodiments, the sprinkler 10 uses the planetary gear drive 12 and the additional reversing mechanism 13 to change the direction of rotation of the nozzle turret 26. The overall reversing mechanism of the sprinkler 10 can have two portions, namely, the components of the reversing mechanism 13 that are located external of the gear box housing 34, and another portion that is contained within the planetary gear drive 12 that includes the shifting drive clutch 48, sun gear 66, idler gear 56, and/or sun gear 60. An advantage of including at least a portion of the overall reversing mechanism in the planetary gear drive 12 is that the shifting can be done in a low torque region of the planetary gear drive 12 where damage and wear to gears is much less likely to occur. This can reduce or eliminate the need to use conventional arc-shaped shifting frames with delicate pinion gears that engage a bull gear assembly and bear large loads. The planetary gear drive 12 can deliver relatively high rotational torque to the nozzle turret 26 in a manner that is useful in rotor-type sprinklers used to water large areas such as golf courses, parks, playing fields or any other irrigated area. Such high torque may prematurely wear out and/or strip conventional pivoting gear train reversing mechanisms. The different gear tooth profiles of the ring gears 50 and 51 and the upper and lower stages of the shifting drive clutch 48 desirably result in the nozzle 14 rotating in both the clockwise and counter-clockwise directions at a substantially uniform predetermined speed of rotation.

High output torque is important for sprinklers. Sprinklers of this type discharge water from the sprinkler while the sprinkler is rotating. Discharging the water creates substantial radial forces on the nozzle turret 26 that results in significant drag and resistance to rotation of this component of a rotor—type sprinkler. The gear drives utilized in this type of sprinkler must overcome this resistance.

The fast spinning turbine 28 can slowly rotate the nozzle turret 26 through the reversing planetary gear drive 12 and the additional reversing mechanism 13. The additional reversing mechanism 13 includes cams and components that lift and drop the output shaft 46. An adjusting gear shaft 110, ring gear 112, adjusting gear 104, and an adjusting arc tab 116 cooperate with the reversing mechanism 13 to permit user adjustment of the size of the arc of oscillation of the nozzle 14. To adjust the arc of coverage, the installer can turn the adjusting gear shaft 110 with a tool (not shown) providing an adjustment of the arc of coverage.

The reversing mechanism 13 includes an upper shift housing 72 (FIG. 3) and a lower shift housing 74 that mate to form a complete housing with a hollow interior that encloses most of the other components of the reversing mechanism 13 hereafter described. The reversing mechanism 13 further includes a shift member 76' that is rigidly secured to the upper end of the control shaft 46. The shift member 76 can be semi-spherical and/or barrel-shaped. In some cases, the shift member 76 is integrally formed with the control shaft 46. The reversing mechanism 13 can include a pivotable shift fork 78 (FIG. 3) with first and second spaced apart cams 80, 82. The first cam 80 can be configured with a sloped surface (not shown) that raises the control shaft 46 when the shift fork 78 is pivoted to engage the first cam with the shift member 76. The second cam 82 can be configured with an oppositely sloped surface that lowers the control shaft 46 when the shift fork 78 is pivoted to engage the second cam with the shift member 76.

The reversing mechanism 13 further includes a shift crank 84 (FIG. 3) that pivotally supports the shift fork 78 inside the joined upper and lower shift housings 72 and 74. An over-center coil spring 94 (FIG. 3) biases the shift fork 78 so that either the first cam 80 or the second cam 82 is engaged with the shift member 76. The over-center spring 94 has a first end connected to a first over center movable pivot 86 coupled to the lower shift housing 74 and a second end connected to a central segment of the shift crank 84. Additional details regarding the reversing mechanism 13 are disclosed in U.S. Pat. No. 8,955,768 of Clark et el. granted Feb. 17, 2015, entitled REVERSING MECHANISM FOR AN IRRIGATION SPRINKLER WITH REVERSING GEAR DRIVE, the entire disclosure of INCLUDING SLIDING CLUTCH AND DRIVEN BEVEL GEARS, the entire disclosure of which is hereby incorporated by reference.

FIG. 4 illustrates an arc adjustment assembly of an embodiment of the present application. As illustrated, the arc adjustment assembly can include an adjustment shaft 110. The adjustment shaft 110 can be configured to interact with one or more components of the arc adjustment assembly to change the arc over which the nozzle deposits water during operation of the sprinkler. For example, the adjustment shaft 110 can be configured to interact with an adjustable arc tab assembly 120. In some cases, the adjustment shaft 110 includes a gear configured to interact with another gear (e.g., a gear of the adjustable arc tab assembly 120) in the nozzle turret 26 or elsewhere in the sprinkler to adjust the arc of the sprinkler.

The adjustment shaft 110 can extend through a top portion of the nozzle turret 26 (e.g., in the frame of reference 9 of FIG. 4) and a nozzle base 102 (FIG. 2B). The adjustment shaft can include an adjustment gear 104. In some embodiments, the adjustment shaft 100 includes a user interface portion 114. The user interface portion 114 can be positioned on an end of the adjustment shaft 110 opposite the adjustment gear 104. A user of the arc adjustment assembly may rotate and/or tilt the adjustment shaft 110 via rotation of the user interface portion 114 (e.g., via use of a tool, hands, or otherwise). A shaft portion 100 can extend along the length of the adjustment shaft 110 between the user interface portion 114 and adjustment gear 104.

Figure 5:
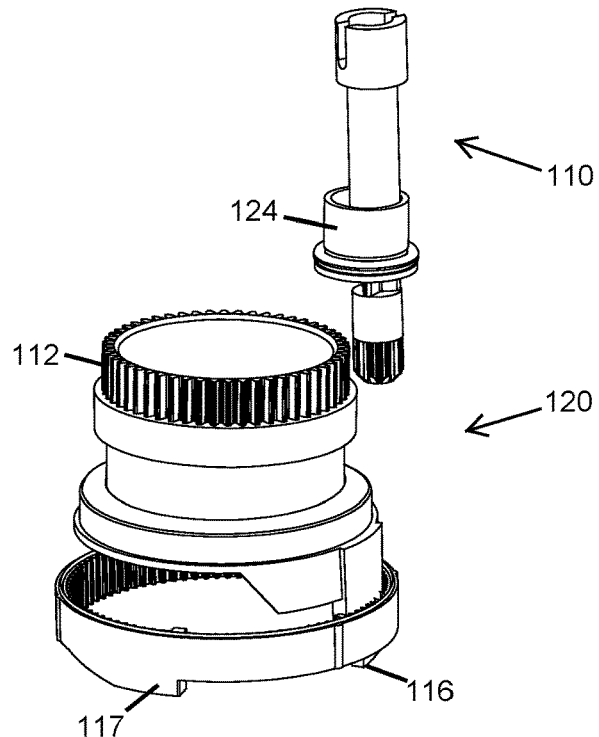
FIG. 5 is a view of the adjusting components with the arc adjusting gear disengaged and the arc set for a minimum arc coverage.

The adjustment gear 104 can be configured to mesh (e.g., FIG. 4) and unmesh (e.g., FIG. 5) with a ring gear 112. The ring gear 112 can be connected to an adjustable arc tab 116. For example, one or both of the ring gear 112 and adjustable arc tab 116 can be connected to or integral with an adjustable arc tab assembly 120. The adjustment gear 104 can be configured to rotate the ring gear 112 in a manner substantially similar to that described in U.S. Pat. No. 8,955,768. In some embodiments, as described below with respect to FIGS. 7 and 8, the ring gear 112 can be configured to rotationally lock with the riser 22 when not being adjusted by the adjustment gear 104.

Figure 6:
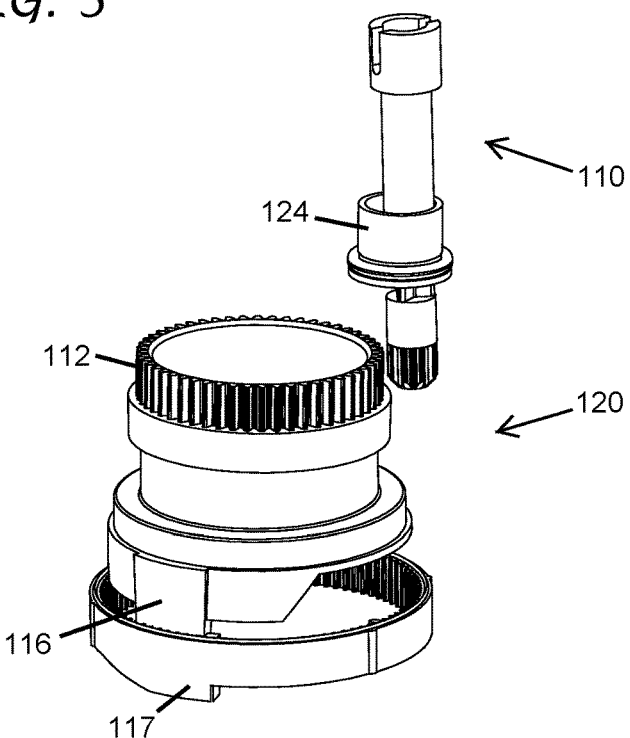
FIG. 6 is a view of the adjusting components with the arc adjusting gear disengaged and the arc set for a 360 degree arc coverage.

The adjustable arc tab 116 can be rotated with respect to the riser 22 to adjust the arc of coverage of the sprinkler. For example, a circumferential distance between the adjustable tab 116 and a fixed tab 117 of the sprinkler can be adjusted to accommodate small angles (e.g., FIG. 5, which illustrates a gap between the tabs 116, 117) and/or 360 degree continual rotation (e.g., FIG. 6, which illustrates the adjustable tab 116 positioned behind the fixed tab 117). The reversing mechanism can include a shift arm 73 (FIG. 3) configured to abut the tabs 116, 117 during rotation of the nozzle turret 26 and to switch direction of rotation of the nozzle turret in a manner similar to or the same as that described in U.S. Pat. No. 7,861,949 of Crooks granted on Jan. 4, 2001 entitled Adjustable arc rotor-type sprinkler with selectable unidirectional full circle nozzle rotation, the entire disclosure of which is hereby incorporated by reference.

Figures 7, 8:
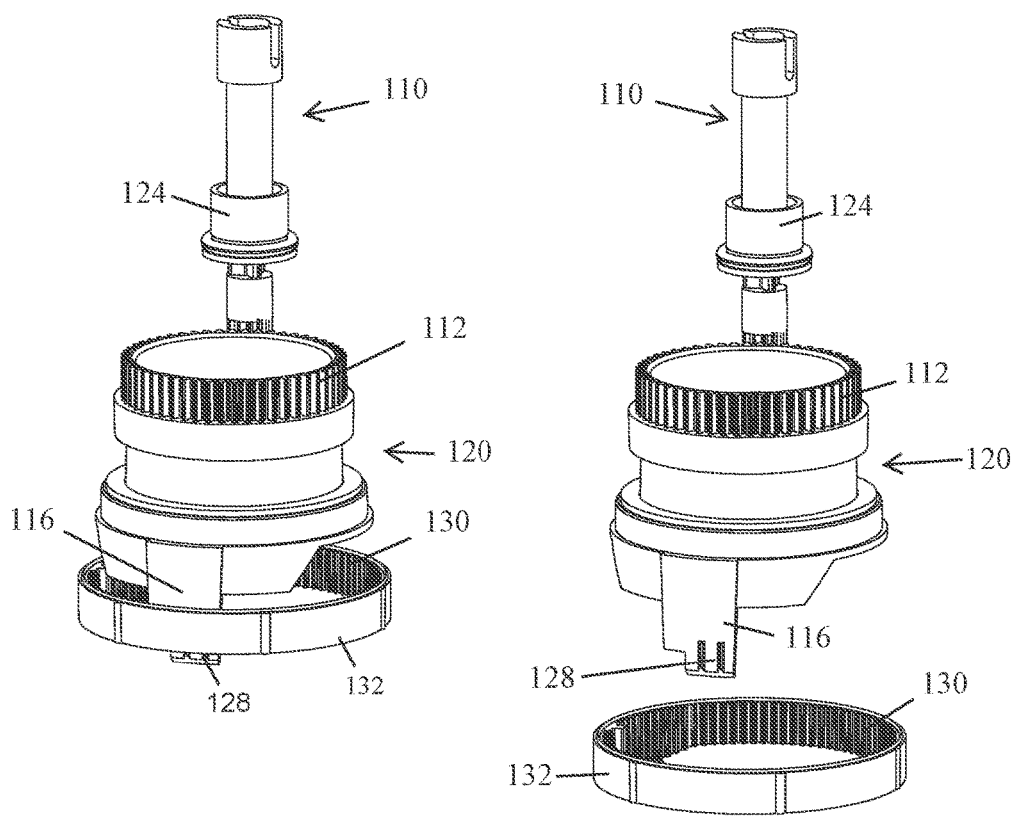
FIG. 7 illustrates the interface between the adjustable arc tab and the arc adjusting ring.
FIG. 8 is an exploded view of FIG. 7.
Figure 9:
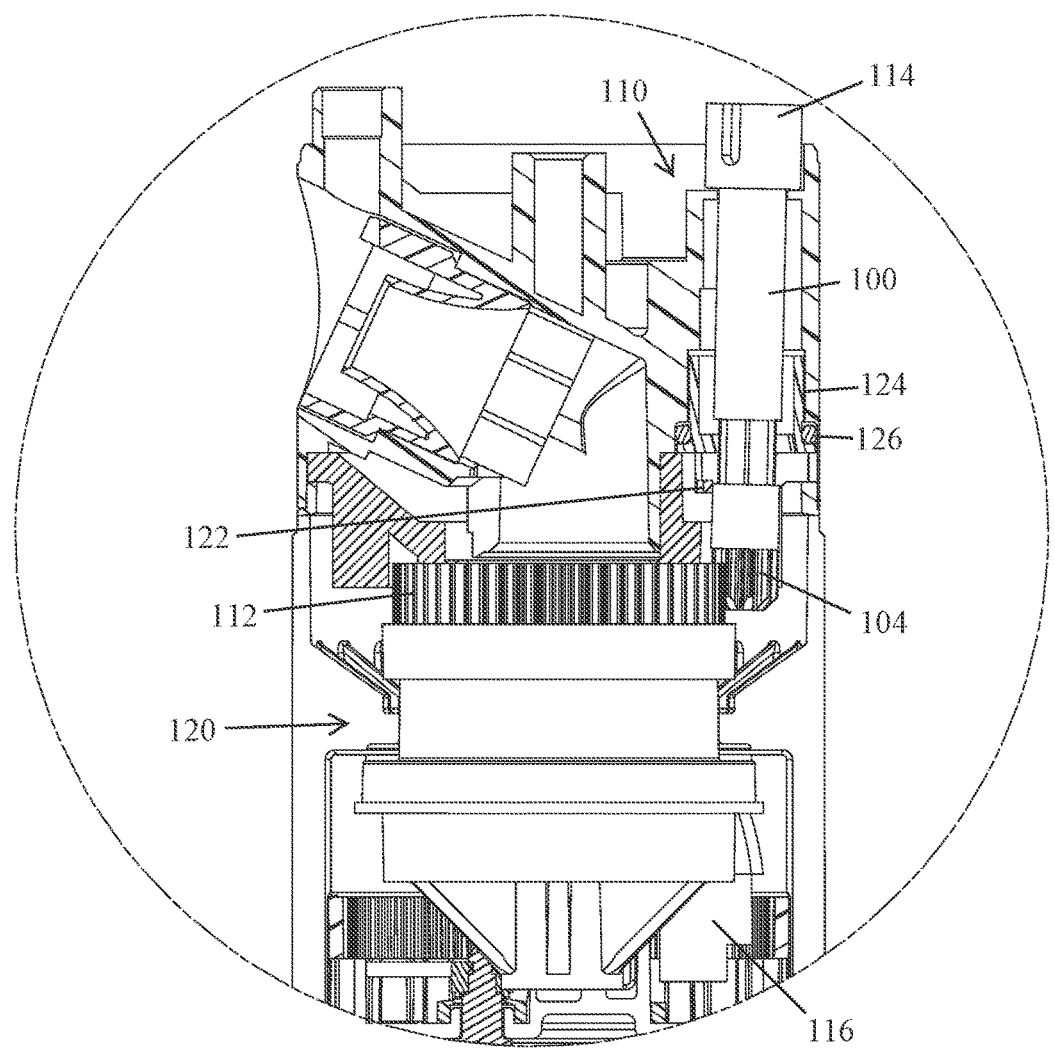
FIG. 9 is an enlarged view of the adjusting section of FIG. 5 with the arc adjusting gear engaged.

As illustrated in FIGS. 7 and 8, the adjustable arc tab 116 can include structures configured to lock the adjustable arc tab 116 in place with respect to the fixed arc tab 117 when the user is not adjusting the adjustable arc tab 116. For example, the adjustable arc tab can include one or more teeth 128 or recesses configured to engage with teeth or recesses 130 on the ring 132 to which the fixed arc tab 117 is connected. The ring 132 can be rotational fixed or otherwise integrated into some component of the riser assembly to inhibit or prevent rotation of the ring 132 with respect to the riser 22. Engagement between the teeth/recesses 128 of the adjustable arc tab 116 and the teeth/recesses of the ring 132 can inhibit or prevent inadvertent rotation of the adjustable tab 116 during operation of the sprinkler. The adjustable arc tab 116 can be configured to flex when a user uses the adjustment shaft 110 to adjust the position of the adjustable arc tab 116. Flexure of the adjustable arc tab 116 can permit ratcheting of the teeth 128 with respect to the ring 132 to change the circumferential distance between the tabs 116, 117.

During operation of the sprinkler, it is desirable that the adjustment gear 104 disengage (e.g., unmesh) from the ring gear 112 when the user is not adjusting the arc of the sprinkler. Such disengagement is desirable or necessary to reduce the risk that the adjustable arc tab 116 moves with respect to the riser 22 when the adjustment shaft 110 travels with the rotation of the nozzle turret 26. Such movement can change the arc of coverage of the sprinkler in an unpredictable and/or undesirable manner.

As illustrated in FIGS. 9-12, adjustment shaft 110 of the present application can be configured to disengage the adjustment gear 104 from the ring gear 112 by moving the adjustment gear 104 away from the ring gear 112. For example, the adjustment shaft 110 can be configured to move the adjustment gear 104 in a direction that is non-parallel to an axis of rotation of the ring gear 112. In some embodiments, the adjustment gear 104 is biased away from the ring gear 112 in a direction non-parallel to the axis of rotation of the ring gear 112. For example, a biasing member 122 (e.g., a spring, a wire, or some other flexible or resilient structure) can contact a portion of the adjustment shaft 110 to push the adjustment gear 104 away from the ring gear 112.

Figure 10:
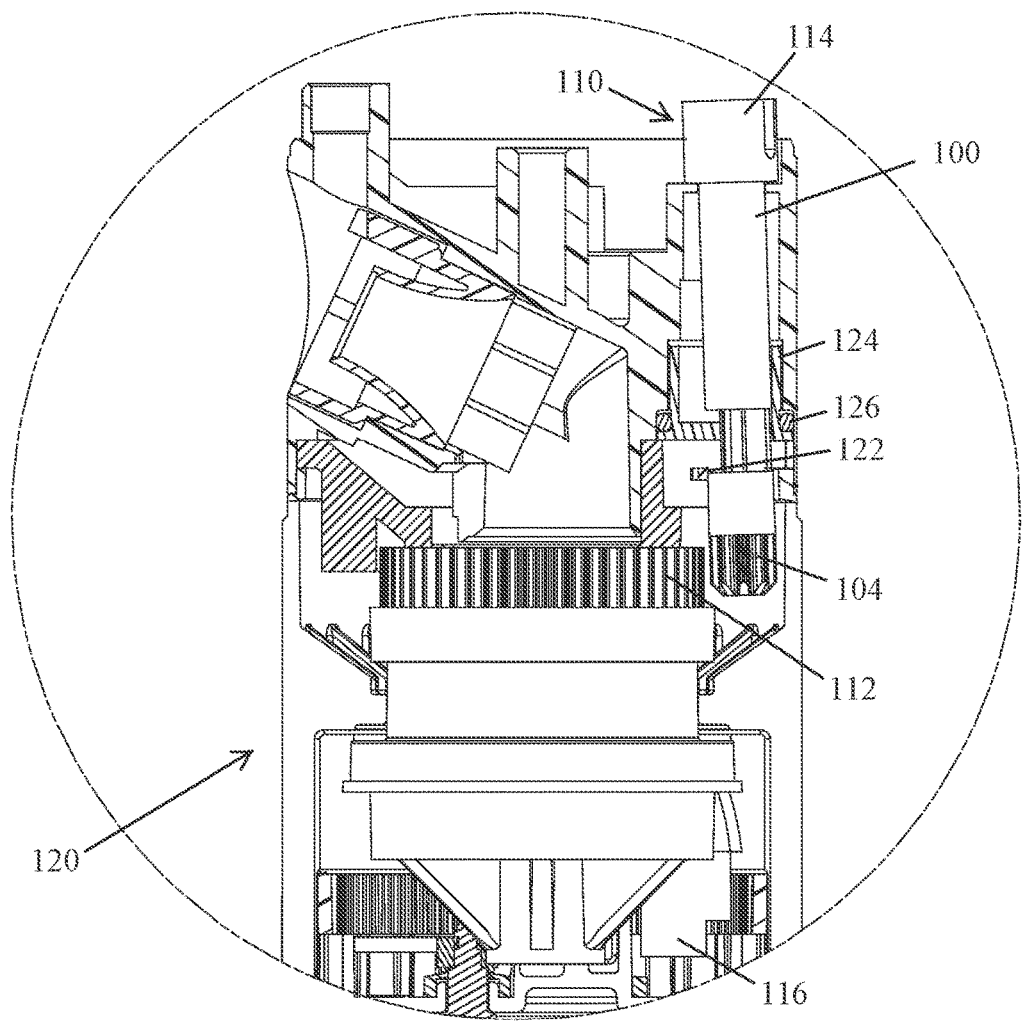
FIG. 10 is an enlarged view of the adjusting section of FIG. 5 with the arc adjusting gear disengaged.
Figure 11:
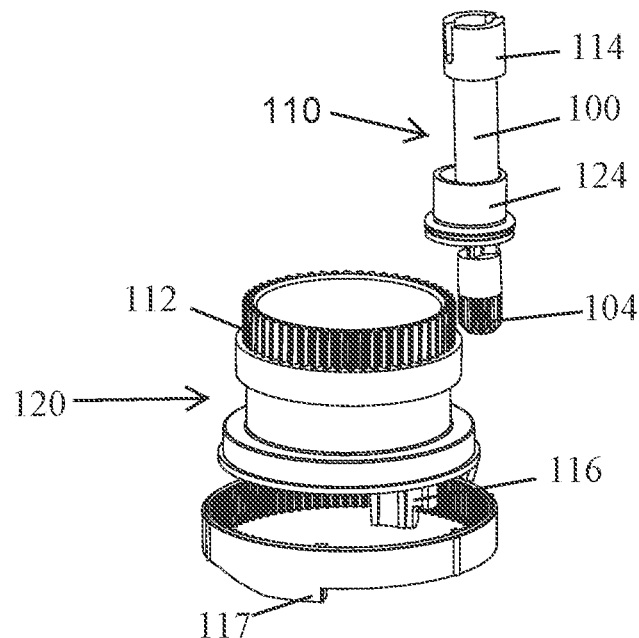
FIG. 11 is a view of the adjusting components with the arc adjusting gear disengaged and the arc set at a first arc position.
Figure 12:
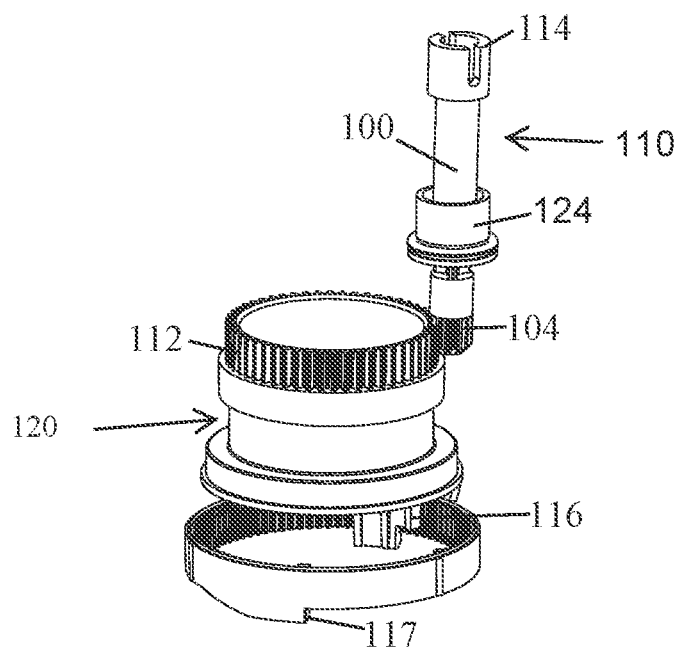
FIG. 12 is a view of the adjusting components with the arc adjusting gear engaged and the arc set at a first arc position.

The adjustment gear 104 gear can be partially or completely unmeshed from the ring gear 112 when in the disengaged position (FIGS. 10 and 11). In some such cases, the adjustment shaft 110 is tilted with respect to (e.g., non-parallel to) the ring gear 112 when the adjustment gear 104 is in the disengaged position. In some embodiments, the user can move the adjustment gear 104 toward ring gear 112 to the engaged position (FIGS. 9 and 12) in a manner which overcomes the biasing force of the biasing member 122. For example, user manipulation of the adjustment shaft 110 can tilt the adjustment shaft 110 into a parallel or substantially parallel alignment with the axis of rotation of the ring gear 112.

In some embodiments, the arc adjustment assembly of the present application includes an adjustment clutch 124. The adjustment clutch 124 can be configured to transition the adjustment gear 104 to the engaged position when a user rotates the adjustment shaft 110. In some embodiments, the adjustment clutch 124 is configured to align the adjustment shaft 110 with the axis of rotation of the ring gear 112 when the user rotates the adjustment shaft 110. In some cases, the adjustment clutch 124 rotates with the adjusting shaft 110 when the adjustment shaft 110 has transitioned to the engaged position.

Figure 13:
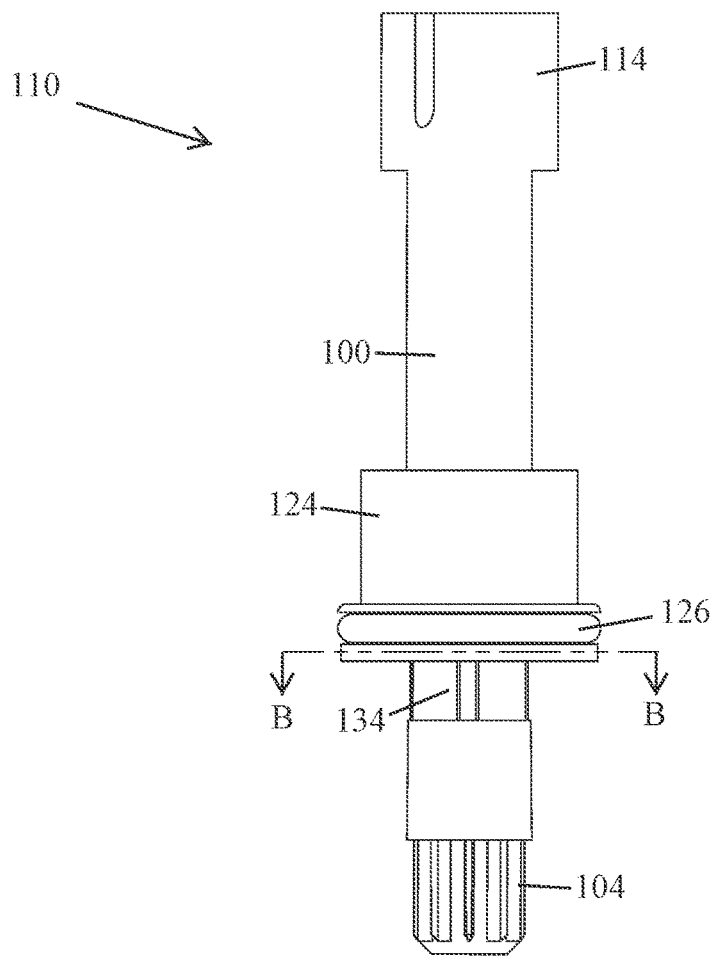
FIG. 13 illustrates the adjusting shaft assembly.

The adjustment clutch 124 can be mounted in the nozzle turret 26 or elsewhere within the sprinkler. In some embodiments, the adjustment clutch 124 surrounds a portion of the adjustment shaft 110. The adjustment clutch 124 can be configured to rotate within the nozzle turret 26. In some embodiments, as illustrated in FIG. 13, an O-ring 126 or other high friction device is mounted on the adjustment clutch 124 or otherwise mounted in the nozzle turret 26. The O-ring 126 can increase the friction between the adjustment clutch 124 and some portion of the nozzle turret 26. The increased friction can increase the alignment force of the adjustment shaft 110. In some cases, an axis of rotation of the adjustment clutch 124 is fixed with respect to the axis of rotation of one or both of the nozzle turret 26 and the ring gear 112.

Figure 14:
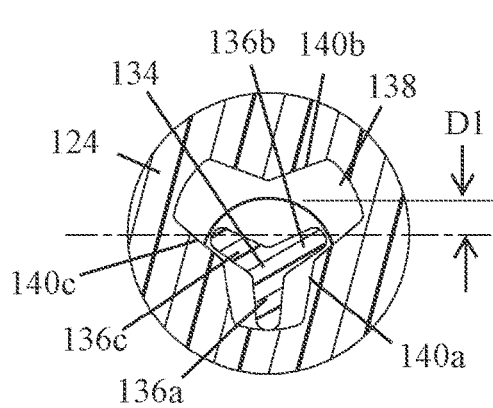
FIG. 14 is a section view of the adjusting shaft assembly taken along the cut plane B-B of FIG. 13 with the adjusting gear in the disengaged position.
Figure 15:
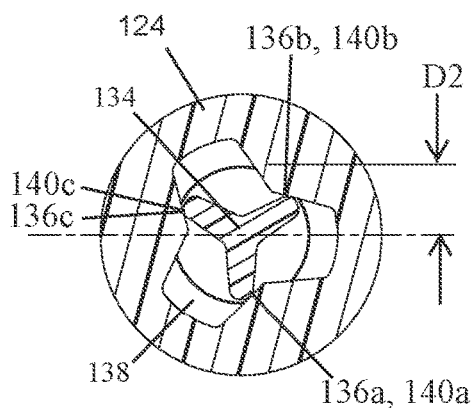
FIG. 15 is a section view of the adjusting shaft assembly taken along the cut plane B-B of FIG. 13 with the adjusting gear in the engaged position.

As illustrated in FIGS. 13 through 15, the adjustment shaft 110 can include an alignment portion 134. The alignment portion 134 can be positioned along the length of the adjustment shaft 110 between the gear 104 and the user interface portion 114. In some embodiments, the alignment portion 134 includes a plurality of ribs 136. For example, the alignment portion 136 can include 3 ribs 136a, 136b, 136c. Other numbers of ribs are possible (e.g., four ribs, five ribs, eight ribs, etc.).

The alignment clutch 124 may include an alignment aperture 138 configured to accommodate the alignment portion 134 of the adjustment shaft 110. The alignment aperture 138 can include a plurality of recesses configured to receive the individual ribs 136. In some embodiments, the alignment aperture 138 is sized and shaped such that the maximum diameter circle that can be drawn in the aperture without extending through solid material of the clutch 134 is smaller than the smallest diameter circle that can be drawn around the alignment portion 134 of the alignment shaft 110. In some embodiments, the ribs 136 are not permitted to pass out from the respective recesses in which they are received when the alignment shaft 110 is rotated.

In some embodiments, interaction between the ribs 136 of the alignment portion 134 and walls 140 of the alignment aperture 138 transition the alignment gear 104 from the disengaged configuration to the engaged configuration. For example, the interaction between the ribs 136 of the alignment portion 134 and walls 140 of the alignment aperture 138 can tilt the alignment shaft 110 from non-parallel alignment with respect to the axis of rotation of the ring gear 112 toward or to a parallel alignment of the alignment shaft with the axis of rotation of the ring gear 112.

As illustrated in FIG. 14, one or more of the ribs 136a, 136b, 136c can be out of contact with one or more of the walls 140a, 140b, 140c when the alignment portion 134 of the alignment shaft 110 is misaligned with the alignment clutch 124 (e.g., when the alignment gear 104 is in the disengaged position). As illustrated in FIG. 15, each of the ribs 136a, 136b, 136c can be in contact with a wall 140a, 140b, 140c of the alignment aperture 138 when the alignment shaft 110 is aligned with the alignment clutch 134. Contact between the ribs 136 and the walls 140 can transfer torque from the alignment shaft 110 to the alignment clutch 134. Such torque transfer can cause the alignment clutch 134 to rotate with rotation of the alignment shaft 110. In some embodiments, rotation of the alignment clutch 134 permits rotation of the alignment shaft 110. For example, the rotation of the alignment clutch can permit the alignment shaft 110 to rotate beyond bringing the ribs 136 into contact with the walls 140 of the alignment aperture. It should be appreciated that FIGS. 14 and 15 illustrate an arrangement in which the alignment clutch 124 and alignment shaft 110 are configured to rotate in a counter-clockwise direction with respect to the orientation to the page.

Figure 16:
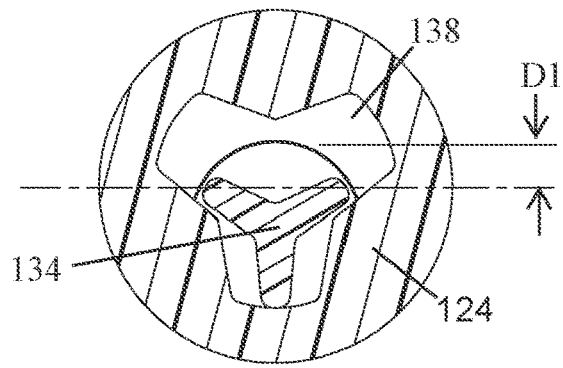
FIG. 16 is a section view of the adjusting shaft assembly taken along the cut plane B-B of FIG. 13 with the adjusting gear in the disengaged position.
Figure 17:
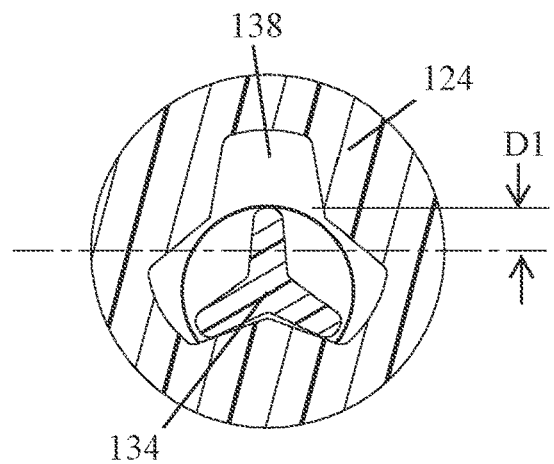
FIG. 17 is a section view of the adjusting shaft assembly taken along the cut plane B-B of FIG. 13 with the adjusting gear in the disengaged position.
Figure 18:
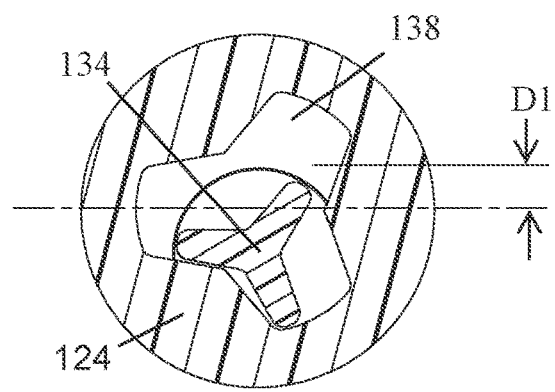
FIG. 18 is a section view of the adjusting shaft assembly taken along the cut plane B-B of FIG. 13 with the adjusting gear in the disengaged position.

As illustrated, a minimum distance D1 between the gear 104 and the centerline of the clutch 124 when the gear 104 is in the disengaged position (FIG. 14) is less than the minimum distance D2 between the gear 104 and the centerline of the clutch 124 when the gear is in the engaged position (FIG. 15). These changes in distance can be attributed to tilting of the alignment shaft 110 with respect to the clutch 124 and/or with respect to the rotational axis of the ring gear 112 (e.g., under the biasing force of the biasing member 122). As illustrated in FIGS. 16-18 the minimum distance D1 between the gear 104 and the centerline of the clutch 124 when the gear 104 is in the disengaged position can be substantially the same, independent of the initial rotational orientation of the alignment shaft 110 with respect to the clutch 134 when the biasing member 122 biases the alignment shaft 110 to the disengaged position.

Figure 19:
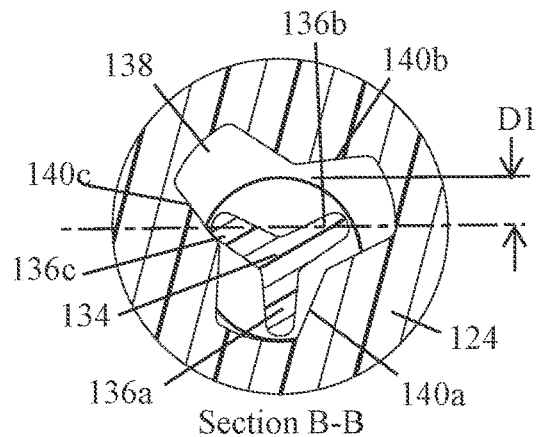
FIG. 19 is a section view of the adjusting shaft assembly taken along the cut plane B-B of FIG. 13 with the adjusting gear in a first step transitioning from the disengaged position to the engaged position.
Figure 20:
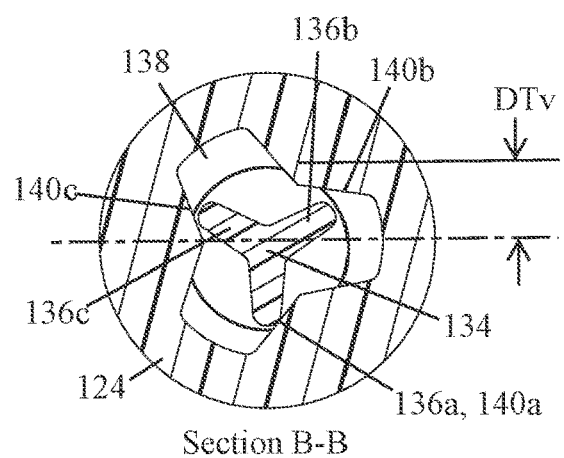
FIG. 20 is a section view of the adjusting shaft assembly taken along the cut plane B-B of FIG. 13 with the adjusting gear in a second step transitioning from the disengaged position to the engaged position.
Figure 21:
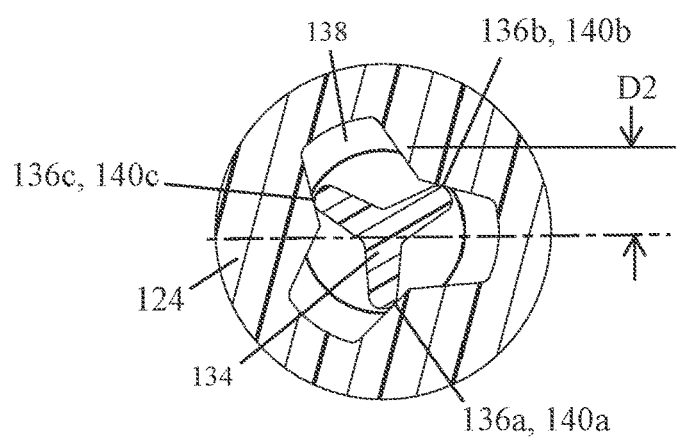
FIG. 21 is a section view of the adjusting shaft assembly taken along the cut plane B-B of FIG. 13 with the adjusting gear in the engaged position.

FIGS. 19-21 illustrate an example of the alignment gear 104 transitioning from the disengaged position to the engaged position. As illustrated in FIG. 19, the alignment portion 134 can begin in a position (e.g., the disengaged position of the gear 104) wherein only one of the ribs (e.g., rib 136c) is in contact with a wall (e.g., wall 140c) of the alignment aperture 138. As the alignment shaft 110 is rotated in the counter-clockwise direction with respect to the page of FIGS. 19-21, the rib 136c slides along the wall 140c of the alignment aperture until another rib (e.g. 136a) contacts another wall (e.g., 140a) of the alignment aperture 138. In this transitional position (FIG. 20), the minimum distance DTv is less than the distance D2 of the fully engaged gear 104 and more than the minimum distance D1 when the gear 104 is fully disengaged. At this point, both ribs 136c, 136a continue to slide along their respective walls 140c, 140a until the last rib (e.g., 136b) contacts the last untouched wall (e.g., 140b). Upon contact of every rib with a wall of the alignment aperture, the gear 104 can be brought into the engaged position (FIG. 21). The friction member 126 (e.g., O-ring) can inhibit the clutch 134 from rotating prior to alignment of the alignment shaft 110 with the clutch 134 (e.g., prior to contact of all the ribs with the walls of the alignment aperture 138). In some cases, the friction generated by the friction member 126 can be greater than the friction between the ribs 136 and walls 140. The clutch alignment feature can be configured to work the same way if the alignment shaft 110 is rotated in a clockwise direction. Therefor the adjustments can be made in either a clockwise rotation or a counter clockwise rotation to either enlarge the arc of coverage of the sprinkler, or reduce the arc of coverage.

Figure 22:
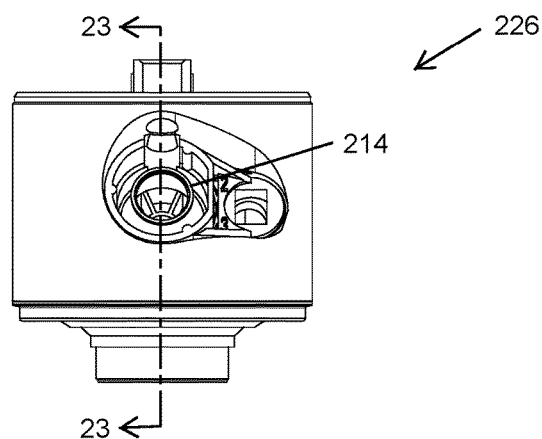
FIG. 22 is another embodiment of a nozzle housing that has an axially moving disengaging arc adjustment shaft.
Figures 23, 24:
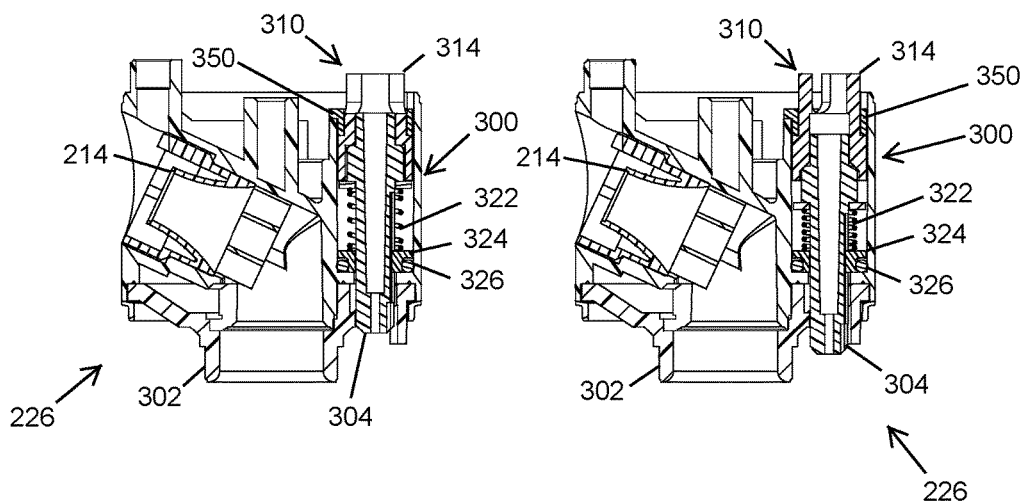
FIG. 23 is a vertical sectional view of the nozzle housing of FIG. 22 taken along the cut plane 23-23 of FIG. 22, with the arc adjusting shaft in a retracted, disengaged, unmeshed position.
FIG. 24 is a vertical sectional view of the nozzle housing of FIG. 22 taken along the cut plane 23-23 of FIG. 22, with the arc adjusting shaft in an extended, engaged, meshed position.

In another embodiment, a nozzle housing with an arc adjusting shaft that moves in an axial direction (e.g., a direction parallel to the length of the arc adjusting shaft) to engage or disengage the arc adjusting shaft with the adjustable arc tab assembly 120 (FIGS. 5-8) may be used in the sprinkler 10. FIGS. 22-24 illustrate an embodiment of a nozzle housing 226 with an axially moving disengaging arc adjusting shaft. As illustrated, the arc adjustment assembly can include an adjustment shaft assembly 300. The adjustment shaft assembly 300 can be configured to interact with one or more components of the arc adjustment assembly to change the arc over which the nozzle deposits water during operation of the sprinkler. For example, the adjustment shaft assembly 300 can be configured to interact with the adjustable arc tab assembly 120. In some cases, the adjustment shaft assembly 300 may include a gear configured to interact with another gear of the adjustable arc tab assembly 120.

Figure 25:
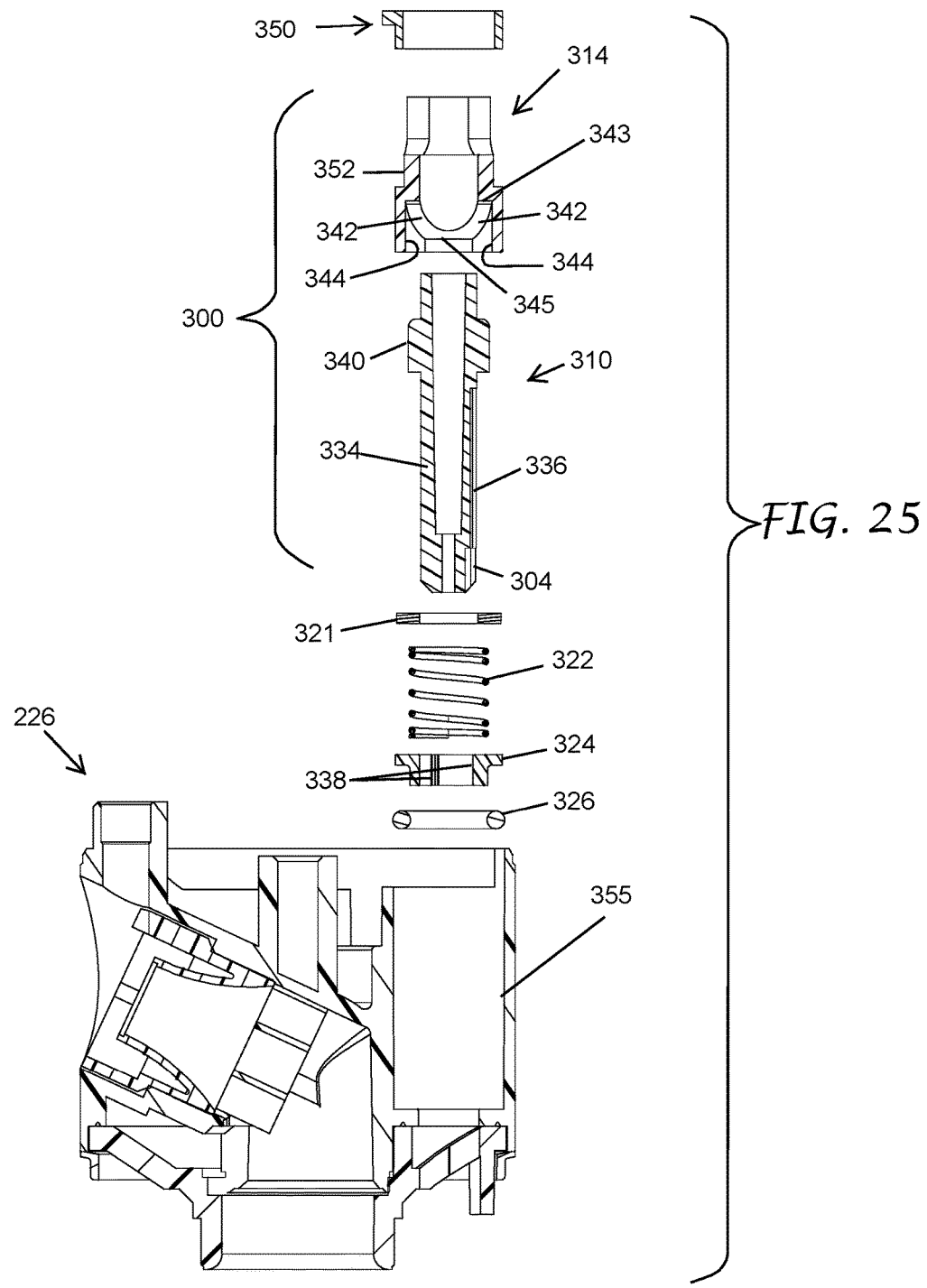
FIG. 25 is an exploded view of FIG. 23.
Figure 26:
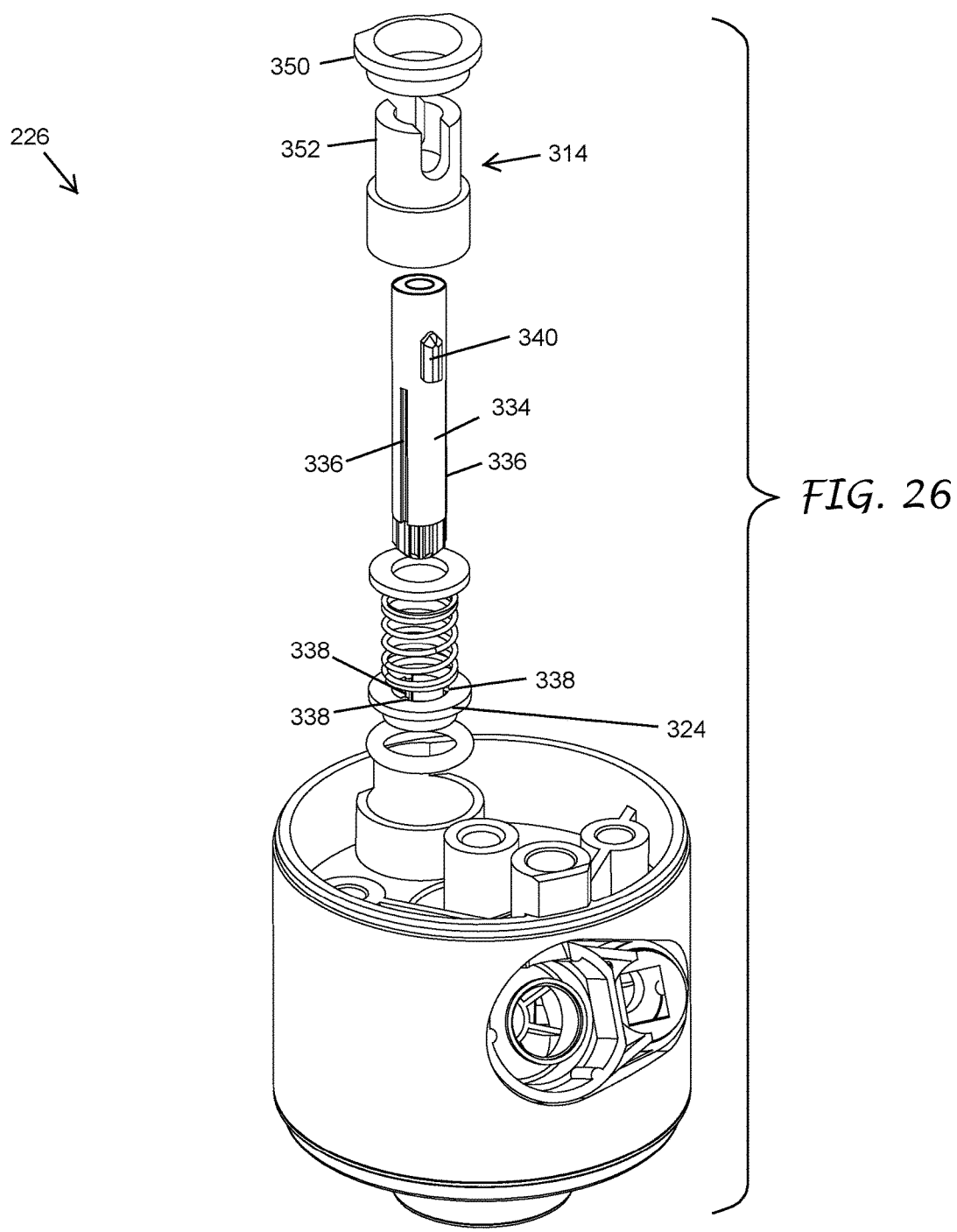
FIG. 26 is an exploded view of the nozzle housing of FIG. 22.
Figure 27:
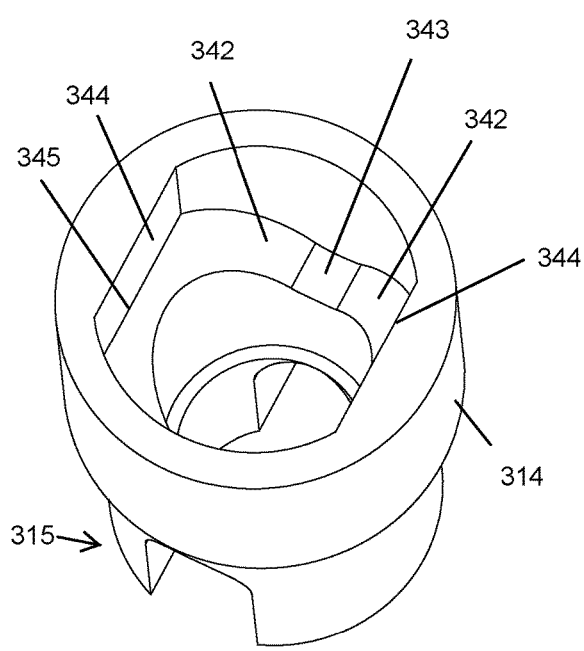
FIG. 27 is a lower perspective view of the user adjusting component illustrating the internal cam surface.
Figure 28:
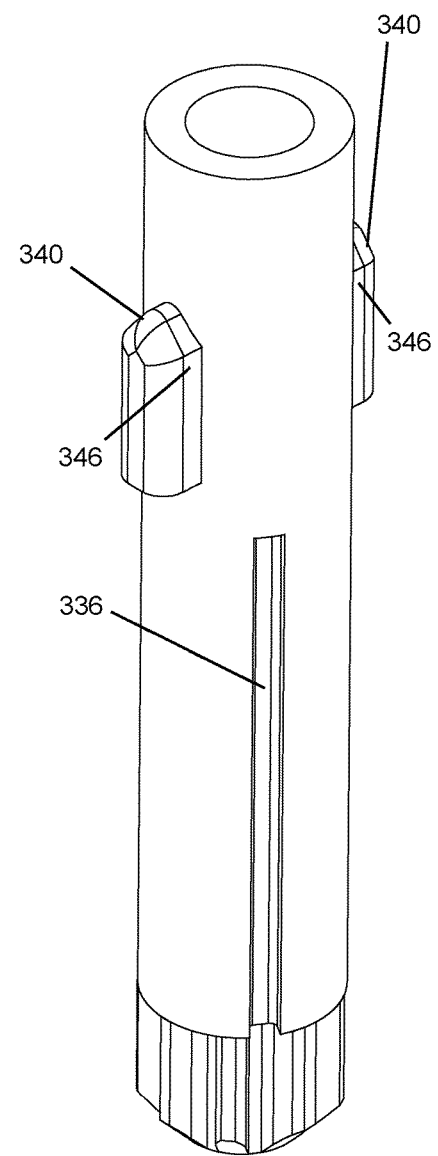
FIG. 28 is a perspective view of the arc adjusting shaft and gear.

The adjustment shaft assembly 300 can extend through a top portion of the nozzle turret 226 and a nozzle base 302 (FIG. 23). The adjustment shaft assembly 300 can include a shaft portion 310. The shaft portion 310 can include an adjustment gear 304. In some embodiments, the adjustment shaft assembly 300 includes a user interface portion 314 (e.g., a user interface cap). The user interface portion 314 can be positioned on (e.g., adjacent to, partially surrounding, attached to, resting on, and/or aligned with) an end of the shaft portion 310 opposite the adjustment gear 304. Preferably, at least a portion of the user interface portion 314 extends through an upper (e.g., downstream) end of the nozzle turret 226. A user of the arc adjustment assembly may rotate and/or lower the shaft portion 310 via rotation of the user interface portion 314 (e.g., via use of a tool, hands, or otherwise). For example, the user interface portion 314 may include tool-engagement portion 315 (FIG. 27). The tool-engagement portion 315 can comprise one or more indentations, protrusions, tactile surfaces, or other structures configured to facilitate engagement of the user interface portion 314 with a tool or hand of a user. In some embodiments, an inner wall 355 of the nozzle turret 226 includes one or more steps, protrusions, or other structures configured to interfere with the interface portion 314 to provide a stop to movement of the interface portion 314 in the downward (e.g., upstream) direction of FIG. 25.

The adjustment gear 304 can be configured to mesh (in the lower position illustrated in FIG. 24) and unmesh (in the raised position illustrated in FIG. 23) with the ring gear 112. The adjustment gear 304 can be configured to rotate the ring gear 112 in a manner substantially similar to that described earlier except that the adjustment gear 304 moves in an axial direction rather than in a tilting direction as described with respect to adjusting gear 104.

Figure 30:
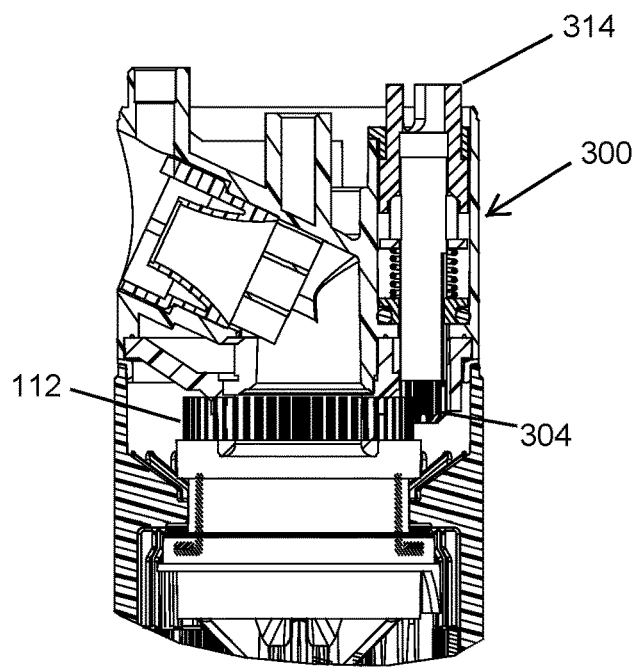
FIG. 30 is a sectional view of a nozzle turret and adjustment shaft assembly of FIG. 22 wherein arc adjusting gear and the ring gear are meshed.

During operation of the sprinkler, it is desirable that the adjustment gear 304 disengage (e.g., unmesh) from the ring gear 112 when the user is not adjusting the arc of the sprinkler. As illustrated in FIGS. 23-28, the shaft portion 310 of the present application can be configured to disengage the adjustment gear 304 from the ring gear 112 by moving the adjustment gear 304 in an axial direction from the ring gear 112. For example, the shaft portion 310 can be configured to move the adjustment gear 304 in a direction that is parallel to an axis of rotation of the ring gear 112. In some embodiments, the adjustment gear 304 is biased away from the ring gear 112. For example, a biasing member 322 (e.g., a spring, a wire, or some other flexible or resilient structure) and a spring support 321 can surround the adjustment shaft and contact a portion of the shaft portion 310 to push the adjustment gear 304 away from the ring gear 112. In some embodiments, the biasing member 322 and/or spring support 321 (e.g., a washer) contact one or more protrusions (e.g., the cam followers 340, discussed below), flanges, or other portions of the shaft portion 310 to apply a biasing force on the shaft portion 310 away from the engaged position illustrated in FIGS. 24 and 30. In some embodiments, the spring support 321 contacts the user interface portion 314 when the adjustment gear 304 is in the retracted configuration, as illustrated in FIG. 23.

The adjustment gear 304 gear can be completely unmeshed from the ring gear 112 when in the disengaged position (FIG. 23). In some embodiments, the user can move the adjustment gear 304 toward ring gear 112 to the engaged position in a manner which overcomes the biasing force of the biasing member 122 without having to press down on the user interface portion 314 of the adjustment shaft assembly 300. For example, user manipulation (e.g., rotation) of the interface portion 314 can force the shaft portion 310 in an axial direction along the centerline of the shaft portion 310 to mesh the adjusting gear 304 with the ring gear 112, as will be described in more detail below.

In some embodiments, the arc adjustment assembly of the present application includes an adjustment clutch 324. As illustrated in FIGS. 25 through 28, the shaft portion 310 can include a clutch engagement portion 334. The clutch engagement portion 334 can be positioned along the length of the shaft portion 310 between the gear 304 and the user interface portion 314. In some embodiments, the clutch engagement portion 334 includes one or more grooves 336. For example, the clutch engagement portion 334 can include three grooves 336. Other numbers of grooves are possible (e.g., one groove, two grooves, four grooves, five grooves, eight grooves, etc.).

The clutch 324 may include one or more internal ribs 338 configured to mate with the clutch engagement portion 334 of the shaft portion 310. The internal ribs 338 can include a plurality of ribs configured to mate with the individual grooves 336. In some embodiments, the grooves 336 are permitted to slide along the ribs 338 but are not permitted to pass out from the respective ribs 338. Engagement between the grooves 336 and ribs 338 can rotationally lock the shaft portion 310 to the clutch 324 while permitting axial movement of the shaft portion 310 with respect to the clutch 324.

The adjustment clutch 324 can be mounted in the nozzle turret 226 or elsewhere within the sprinkler. In some embodiments, the adjustment clutch 324 surrounds a portion of the shaft portion 310. The adjustment clutch 324 can be configured to rotate within the nozzle turret 226. In some embodiments, as illustrated in FIG. 23, an O-ring 326 or other high friction device is mounted on the adjustment clutch 324 or otherwise mounted in the nozzle turret 226. The O-ring 326 can increase the friction between the adjustment clutch 324 and some portion of the nozzle turret 226. In some cases, an axis of rotation of the adjustment clutch 324 is fixed with respect to the axis of rotation of one or both of the nozzle turret 226 and the ring gear 112. The adjustment clutch 324 and/or O-ring 326 can be configured to resist rotation of the shaft portion 310 and adjustment gear 304. In some cases, the adjustment clutch 324 rotates with the adjusting shaft 310 when the shaft portion 310 has transitioned to the engaged position.

As illustrated in FIGS. 25 through 28, the shaft portion 310 can include one or more cam followers 340. The one or more cam followers 340 can be positioned along the length of the shaft portion 310 between the gear 304 and the user interface portion 314. For example, the alignment portion 334 can include two cam followers 340. Other numbers of cam followers are possible (e.g., one, three, four cam followers, etc.). The cam followers 340 can be, for example, protrusions extending outward from the shaft portion 310.

Figure 29:
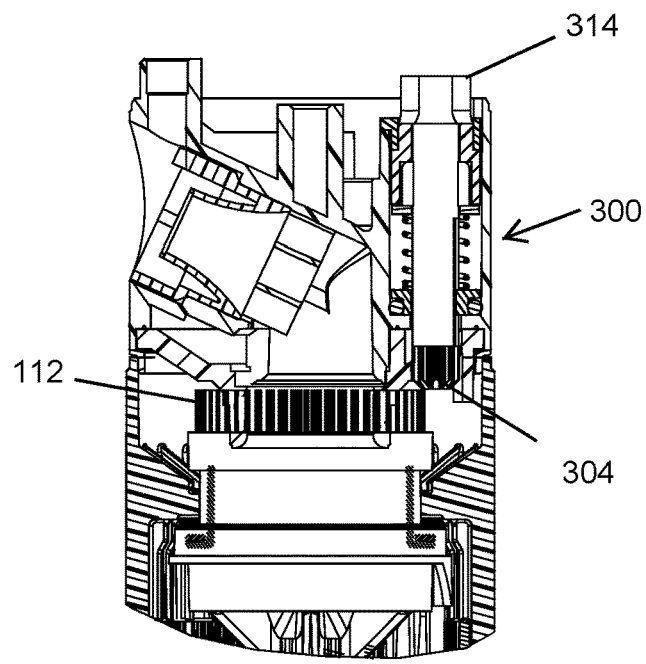
FIG. 29 is a sectional view of a nozzle turret and adjustment shaft assembly of FIG. 22 wherein arc adjusting gear and the ring gear are unmeshed.

The user interface portion 314 may include one or more internal ramps or cams 342 configured to interact with the cam followers 340 of the shaft portion 310. The cam(s) 342 can extend in a vertical direction (e.g., parallel to the length of the shaft portion 310) between a top wall 343 and a bottom edge 345. In some embodiments, the internal cams 342 are configured to force the cam followers 340, and the gear 304 toward the ring gear 112 when a user turns the user interface portion 314. The distance between the top wall 343 and bottom edge 345, as measured parallel to the length of the adjustment shaft portion 310, can define the maximum distance the adjusting gear 304 travels between the unmeshed (FIG. 29) and meshed (FIG. 30) positions with respect to the ring gear 112. In some embodiments, the gear 304 will move (e.g., vertically) into alignment with the ring gear 112 when the operator turns the interface portion 314. The vertical movement of the gear 304 can be realized without vertical movement of the user interface portion 314, thereby allowing a user to transition the gear 304 between the unmeshed and meshed positions without applying a vertical or axial force on the user interface portion 314. Previously, disengaging functionality was accomplished using a spring which biased the entire adjustment shaft assembly (e.g., including the user interface portion, adjustment gear, and shaft portion) upward and out of engagement with the ring gear 112. An example of such structure is recited in U.S. Pat. No. 8,955,768 (e.g., in column 7, lines 17-33). This arrangement works well in many cases, however, the operator must first press the adjusting gear against the spring to get the adjusting gear in position before they turn the tool. Once the gear is pressed down, the user must keep downward pressure on the tool while turning the adjusting gear to keep engaged with the ring gear. Additionally, axial displacement of the user interface portion can create a cavity within the sprinkler above the user interface. Due to the proximity of this cavity to the ground in many applications, dirt, water, and other debris/pollutants can enter the cavity and inhibit or prevent return of the adjustment gear to a disengaged or unmeshed position. By allowing for axial movement of the gear 304 without axial movement of the user interface portion 314, the adjustment shaft assembly 300 of the present disclosure can reduce or eliminate the formation of a cavity in the top of the nozzle turret 226. As such, the likelihood of gear 304 being "stuck" in the meshed position is reduced or eliminated. In some instances, the clutch 324 may inhibit or prevent the adjusting gear 304 from rotating more than is necessary to align the gear 304 and ring gear 112 when the adjustment shaft is moving in an axial direction. In some instances, the clutch 324 may inhibit or prevent the adjusting gear 304 from rotating when the adjustment shaft is moving in an axial direction.

In some embodiments, the user interface portion 314 may include at least one internal drive wall 344. For example, the user interface portion 314 may include two drive walls 344. In some embodiments the cam followers 340 may include at least one side wall 346. In some embodiments, each cam follower may include two side walls 346. In some embodiments, rotational contact of the cam followers 340 (e.g., the drive walls 344) and the side walls 346 may cause the shaft portion 310 to rotate. In some embodiments, when a user turns the user interface portion 314, the adjustment gear 304 is first driven into engagement with the ring gear 112 via interaction between the cam(s) 342 and cam follower(s) 340. For example, the frictional resistance between the cam(s) 342 and cam follower(s) 340 can be less than the frictional resistance between the adjustment clutch 324 (e.g., the O-ring 346 of the adjustment clutch 324) and a wall of the nozzle housing 326, thereby resulting in axial movement of the shaft portion 310 and gear 304 prior to rotation of the shaft portion 310 and gear 304. Continued turning of the user interface portion 314 by the user will cause the clutch 324 and the adjusting shaft 310 to rotate with the user interface portion 314 and cause the gear 304 to turn the ring gear 112 to cause the arc adjustment tab assembly 120 to change position.

In some embodiments, a cap or bearing 350 may be pressed into the nozzle housing 226 that surrounds and supports a bearing surface 352 of the user interface portion 314. The cap/bearing 350 can engage a flange or other portion of the user interface portion 314 to reduce or eliminate the chance of inadvertent removal of the user interface portion 314 from the nozzle turret 226. In some embodiments, the cap/bearing 350 engages with the interface portion 314 to inhibit or prevent motion of the user interface portion 314 parallel to the longitudinal axis of the shaft portion 310. For example, the cap/bearing 350 can engage with a groove on an outer surface of the user interface portion 314. In some embodiments, one or more protrusions on the outer surface of the user interface portion 314 interact with the cap/bearing 350 to inhibit or prevent movement of the user interface portion 314 parallel to the longitudinal axis of the adjustable shaft portion 310.

While we have described and illustrated in detail embodiments of a sprinkler with a reversing gear drive with a disengaging top accessible arc adjusting shaft, it should be understood that our inventions can be modified in both arrangement and detail. For example, the sprinkler 10 could be modified to a simplified shrub configuration without the retraction spring and a shorter outer body so the riser assembly does not extend or retract in the outer housing. The planetary gear drive 12 could be a reversing spline gearbox as disclosed in U.S. Pat. No. 8,955,768. Further, the shaft portion 310 described herein may include ribs instead of or in addition to the grooves 336 discussed. These ribs and/or grooves can be configured to engage with the ribs 338 and/or grooves in the adjustment clutch 324 to rotationally lock the shaft portion 310 to the adjustment clutch 324. Therefore the protection afforded our inventions should only be limited in accordance with the following claims.

What is claimed is:

1. An irrigation sprinkler comprising:
a turbine;
a nozzle;
a gear drive;
a reversing mechanism operatively connected to the gear drive and rotatably coupling the turbine and the nozzle, the reversing mechanism including a shift arm and a first adjustment gear having an axis of rotation;
a first stop tab connected to the first adjustment gear;
a second adjustment gear configured to selectively mesh with and unmesh from the first adjustment gear;
a user interface cap configured to interface with a tool or with a hand of a user, the user interface cap having:
a cam wall extending between a top cam wall end and a bottom cam wall end; and
a driving wall connected to the cam wall; and
an adjustment shaft connected to the second adjustment gear and positioned at least partially within the user interface cap, the adjustment shaft having:
a longitudinal axis; and
at least one protrusion extending from the adjustment shaft in a direction perpendicular to the longitudinal axis;
wherein:
the cam wall is configured to drive the at least one protrusion in a direction parallel to the longitudinal axis of the adjustment shaft when the user interface cap is rotated; and
the user interface cap is configured to transition the second adjustment gear between a meshed position and an unmeshed position with respect to the first adjustment gear without requiring application of force onto or movement of the user interface cap in a direction parallel to the longitudinal axis of the adjustment shaft.

2. The irrigation sprinkler of claim 1, comprising a biasing member configured to bias the adjustment shaft to the unmeshed position.

3. The irrigation sprinkler of claim 2, wherein the biasing member is a spring that surrounds at least a portion of the adjustment shaft.

4. The irrigation sprinkler of claim 1, wherein the user interface cap comprises two cam walls and two driving walls, each of the two driving walls connected to both of the two cam walls.

5. The irrigation sprinkler of claim 1, wherein the driving wall is configured to prevent rotation of the user interface cap with respect to the adjustment shaft upon contacting the at least one protrusion.

6. The irrigation sprinkler of claim 1, comprising an adjustment clutch configured to engage with a portion of one or both of the adjustment shaft and the second adjustment gear.

7. The irrigation sprinkler of claim 6, wherein the adjustment shaft comprises at least one external groove or rib, wherein the adjustment clutch includes at least one internal rib or groove, and wherein the external groove or rib of the adjustment shaft is configured to mate with the internal rib or groove of the adjustment clutch.

8. The irrigation sprinkler of claim 6, wherein the adjustment clutch is rotationally locked with the adjustment shaft and wherein the adjustment shaft is configured to move in a direction parallel to the longitudinal axis of the adjustment shaft with respect to the adjustment clutch.

9. The irrigation sprinkler of claim 6, wherein the adjustment clutch is configured to frictionally engage with an internal wall of the irrigation sprinkler with a first rotational coefficient of friction, wherein the user interface cap is configured to frictionally engage with the adjustment shaft with a second rotational coefficient of friction when the at least one protrusion of the adjustment shaft is not in contact with the driving wall, and wherein the first coefficient of friction is greater than the second coefficient of friction.

10. An irrigation sprinkler comprising:
a turbine;
a nozzle;
a gear drive;
a reversing mechanism operatively connected to the gear drive and rotatably coupling the turbine and the nozzle, the reversing mechanism including a shift arm and a first adjustment gear having an axis of rotation;
a first stop tab connected to the first adjustment gear;
a second adjustment gear configured to selectively mesh with and unmesh from the first adjustment gear;
a user interface cap configured to interface with a tool or with a hand of a user; and
an adjustment shaft connected to the second adjustment gear and positioned at least partially within the user interface cap, the adjustment shaft having a longitudinal axis;
wherein:
the user interface cap is configured to drive the adjustment shaft in a direction parallel to the longitudinal axis of the adjustment shaft between an unmeshed position and a meshed position with respect to the second adjustment gear; and
the adjustment shaft is configured to move with respect to the user interface cap in a direction parallel to the longitudinal axis of the adjustment shaft as the adjustment shaft transitions between the meshed and unmeshed positions.

11. The irrigation sprinkler of claim 10, comprising a bearing configured to fix the user interface cap with respect to the nozzle in a direction parallel to the longitudinal axis of the adjustment shaft.

12. The irrigation sprinkler of claim 10, comprising a spring surrounding at least a portion of the adjustment shaft and configured to bias the adjustment shaft toward the user interface cap.

13. The irrigation sprinkler of claim 10, wherein the adjustment shaft is configured to remain in the unmeshed position in the absence of user or tool interaction with the user interface cap.

14. An irrigation sprinkler comprising:
a turbine;
a nozzle;
a gear drive;
a reversing mechanism operatively connected to the gear drive and rotatably coupling the turbine and the nozzle, the reversing mechanism including a shift arm and a first adjustment gear having an axis of rotation;
a first stop tab connected to the first adjustment gear;
a second adjustment gear configured to selectively mesh with and unmesh from the first adjustment gear;
a user interface cap configured to interface with a tool or with a hand of a user;
an adjustment shaft connected to the second adjustment gear and positioned at least partially within the user interface cap, the adjustment shaft having a longitudinal axis;
wherein:
the user interface cap is fixed in position in a direction parallel to the longitudinal axis of the adjustment shaft; and
the user interface cap is configured to move the adjustment shaft in a direction parallel to the longitudinal axis of the adjustment shaft in response to rotational force upon the user interface cap in a direction of rotation around the longitudinal axis of the adjustment shaft.

15. The irrigation sprinkler of claim 14, comprising a nozzle turret, wherein at least a portion of the user interface cap extends through a downstream end of the nozzle turret.

16. The irrigation sprinkler of claim 14, wherein the user interface cap includes a cam surface and the adjustment shaft includes a cam follower, wherein the cam surface is configured to drive the cam follower in a direction parallel to the longitudinal axis of the adjustment shaft in response to rotation of the user interface cap.

* * * * *